US009377983B2

(12) United States Patent  
Fujieda et al.

(10) Patent No.: US 9,377,983 B2  
(45) Date of Patent: Jun. 28, 2016

(54) INFORMATION PROCESSING APPARATUS, INFORMATION PROCESSING METHOD, AND PROGRAM

(71) Applicants: Takayuki Fujieda, Tokyo (JP); Yoshinori Sochi, Tokyo (JP); Yosuke Aoki, Kanagawa (JP)

(72) Inventors: Takayuki Fujieda, Tokyo (JP); Yoshinori Sochi, Tokyo (JP); Yosuke Aoki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/644,120

(22) Filed: Mar. 10, 2015

(65) Prior Publication Data

US 2015/0261490 A1    Sep. 17, 2015

(30) Foreign Application Priority Data

Mar. 13, 2014   (JP) ................................ 2014-050520  
Feb. 26, 2015   (JP) ................................ 2015-036556

(51) Int. Cl.  
*G06F 3/12* (2006.01)

(52) U.S. Cl.  
CPC ............ *G06F 3/1275* (2013.01); *G06F 3/1205* (2013.01); *G06F 3/1227* (2013.01); *G06F 3/1247* (2013.01); *G06F 3/1253* (2013.01); *G06F 3/1282* (2013.01)

(58) Field of Classification Search  
None  
See application file for complete search history.

(56) References Cited

U.S. PATENT DOCUMENTS

2007/0127064 A1*  6/2007  Kuroshima ........... G06F 3/1204  
                                                                  358/1.15  
2009/0279125 A1   11/2009  Liu et al.  
2012/0287463 A1*  11/2012  Iida ...................... G06F 3/1205  
                                                                  358/1.15

FOREIGN PATENT DOCUMENTS

| JP | 2007-041832 | 2/2007 |
| JP | 2009-271930 | 11/2009 |
| JP | 2012-238188 | 12/2012 |
| JP | 2013-029982 | 2/2013 |
| JP | 2013-088992 | 5/2013 |

* cited by examiner

*Primary Examiner* — Marivelisse Santiago Cordero  
*Assistant Examiner* — Neil R McLean  
(74) *Attorney, Agent, or Firm* — Duft Bornsen & Fettig LLP

(57) ABSTRACT

An information processing apparatus for generating drawing data by using a print job including setting information and printing data. The information processing apparatus includes a conversion unit that converts first setting information into first apparatus setting information in accordance with a form of the first setting information and converts second setting information, converted from the first setting information, into second apparatus setting information in accordance with a form of the second setting information; an information obtaining unit that obtains the second apparatus setting information; and a first comparison result information creating unit that creates apparatus setting information comparison result information by comparing the first apparatus setting information with the second apparatus setting information.

10 Claims, 29 Drawing Sheets

FIG.6A

```
<JDF xmlns="http://www.CIP4.org/JDFSchema_1_1" xmlns:C="www.ccc.com/schema/ccc" ...>
  <ResourceLinkPool>
    <ComponentLink ... Amount = "2" ... />
    ...
  </ResourceLinkPool>
  <ResourcePool>
    <LayoutPreparationParams ... Rotate = "Rotate90" ... >
    ...
    </LayoutPreparationParams>
  </ResourcePool>
</JDF>
```

FIG.6B

```
<JDF xmlns="http://www.CIP4.org/JDFSchema_1_1" xmlns:A="www.aaa.com/schema/aaa" ...>
  <ResourceLinkPool>
    <ComponentLink ... Amount = "2" ... />
    ...
  </ResourceLinkPool>
  <ResourcePool>
    <LayoutPreparationParams ... A:Rotate = "2" ... >
    ...
    </LayoutPreparationParams>
  </ResourcePool>
</JDF>
```

FIG. 6C

```
<JDF xmlns="http://www.CIP4.org/JDFSchema_1_1" xmlns:B="www.bbb.com/schema/bbb" ...>
  <ResourceLinkPool>
    <ComponentLink ... B:DeliveryAmount = "2" ... />
    ...
  </ResourceLinkPool>
  <ResourcePool>
    <LayoutPreparationParams ... B:AlternateRotation = "false" ... B:Rotate = "1" >
    </LayoutPreparationParams>
    ...
  </ResourcePool>
</JDF>
```

FIG.7A

| JDF OF COMPANY C | | JOB ATTRIBUTES WITHIN DFE | |
|---|---|---|---|
| ATTRIBUTE NAME | ATTRIBUTE VALUE | ITEM NAME | ITEM VALUE |
| Amount | 1-32767 | NUMBER OF COPIES | 1-32767 COPIES |
| Rotate | Rotate0 | ROTATION | 0° ROTATION |
| | Rotate90 | | 90° ROTATION |
| | Rotate180 | | 180° ROTATION |
| | Rotate270 | | 270° ROTATION |
| ... | ... | ... | ... |

FIG.7B

| JDF OF COMPANY A | | JOB ATTRIBUTES WITHIN DFE | |
|---|---|---|---|
| ATTRIBUTE NAME | ATTRIBUTE VALUE | ITEM NAME | ITEM VALUE |
| A:Amount | 1-32767 | NUMBER OF COPIES | 1-32767 COPIES |
| A:Rotate | 1 | ROTATION | 0° ROTATION |
| | 2 | | 90° ROTATION |
| | 3 | | 180° ROTATION |
| | 4 | | 270° ROTATION |
| ... | ... | ... | ... |

FIG.7C

| JDF OF COMPANY B | | JOB ATTRIBUTES WITHIN DFE | |
|---|---|---|---|
| ATTRIBUTE NAME | ATTRIBUTE VALUE | ITEM NAME | ITEM VALUE |
| B:DeliveryAmount | 1-32767 | NUMBER OF COPIES | 1-32767 COPIES |
| B:AlternateRotation | true | ROTATION | |
| | false | | |
| B:Rotate | 1 | | 0° ROTATION |
| | 2 | | 90° ROTATION |
| | 3 | | 180° ROTATION |
| | 4 | | 270° ROTATION |
| ... | ... | ... | ... |

FIG.9

| | ITEMS | |
|---|---|---|
| JOB INFORMATION | NUMBER OF COPIES | |
| | DIRECTION INFORMATION | |
| | PRINTING SURFACE INFORMATION | |
| | ROTATION | |
| | SCALING UP/DOWN | |
| EDIT INFORMATION | IMAGE POSITION | OFFSET |
| | | POSITIONAL ADJUSTMENT INFORMATION |
| | LAYOUT INFORMATION | CUSTOM IMPOSITION ARRANGEMENT |
| | | PAGE NUMBER |
| | | IMPOSITION INFORMATION |
| | | PAGE ORDER INFORMATION |
| | | CREEP POSITIONAL ADJUSTMENT |
| | MARGIN INFORMATION | |
| | CROP MARK INFORMATION | CENTER CROP MARK INFORMATION |
| | | CORNER CROP MARK INFORMATION |
| FINISHING INFORMATION | COLLATE INFORMATION | |
| | STAPLE/BIND INFORMATION | |
| | PUNCH INFORMATION | |
| | FOLDING INFORMATION | |
| | TRIMMING INFORMATION | |
| | OUTPUT TRAY INFORMATION | |
| | INPUT TRAY INFORMATION | |
| | COVER SHEET INFORMATION | |
| RIP CONTROL MODE (PAGE MODE OR SHEET MODE) | | |

FIG.10

| | | ITEMS |
|---|---|---|
| INPUT/OUTPUT DATA TYPE INFORMATION | | |
| READING/WRITING POSITION SPECIFYING METHOD INFORMATION FOR INPUT/OUTPUT DATA | | |
| READING/WRITING POSITION INFORMATION FOR INPUT/OUTPUT DATA | | |
| READING/WRITING EXECUTION MODE INFORMATION FOR INPUT/OUTPUT DATA | | |
| UNIT INFORMATION (DIMENSIONS) | | |
| COMPRESSION METHOD INFORMATION FOR INPUT/OUTPUT DATA | | |
| RIP CONTROL MODE | | |
| INPUT/ OUTPUT IMAGE INFORMATION PORTION | INFORMATION ABOUT OUTPUT IMAGE | IMAGE FORMAT TYPE |
| | | IMAGE FORMAT DIMENSIONS |
| | | IMAGE FORMAT RESOLUTION |
| | | IMAGE POSITION |
| | | COLOR SEPARATION INFORMATION |
| | | COLOR PLANE FIT POLICY INFORMATION |
| | | PLANE SHIFT INFORMATION |
| | | COLOR BIT NUMBER OF IMAGE FORMAT |
| | | IMAGE DIRECTION INFORMATION |
| | | IMAGE FORMATION POSITION INFORMATION |
| | | IMAGE FORMATION SIZE INFORMATION |
| | | IMAGE FORMATION METHOD INFORMATION |
| | | COLOR ICC INFORMATION |
| | | FONT SUBSTITUTION INFORMATION |
| | | IMAGE FORMATION ORIGIN INFORMATION |
| | | FLAT K BLACK INFORMATION |
| | | RENDERING INFORMATION |
| | INFORMATION ABOUT INPUT IMAGE | IMAGE FORMAT TYPE |
| | | IMAGE FORMAT DIMENSIONS |
| | | IMAGE FORMAT RESOLUTION |
| | | IMAGE POSITION |
| | | INPUT DATA |
| | | PAGE AREA INFORMATION |
| | | COLOR ICC INFORMATION |
| | INFORMATION ABOUT HANDLING OF IMAGE | SCALING OFFSET INFORMATION |
| | | OBJECT REGION INFORMATION |
| | | HALFTONE INFORMATION |
| | | SCALING ALGORITHM INFORMATION |
| INFORMATION ABOUT PDL | DATA AREA | |
| | SIZE INFORMATION | |
| | DATA ARRANGEMENT METHOD | |

| ITEMS | | | | VALUES OF JOB ATTRIBUTES WITHIN DFE IN JOB 1 | VALUES OF JOB ATTRIBUTES WITHIN DFE IN JOB 2 | COMPARISON RESULT |
|---|---|---|---|---|---|---|
| JOB INFORMATION | NUMBER OF COPIES | | | 1 | 1 | NO DIFFERENCE |
| | NUMBER OF PAGES | | | 5 | 5 | NO DIFFERENCE |
| EDIT INFORMATION | DIRECTION INFORMATION | | | Portait | Portait | NO DIFFERENCE |
| | PRINTING SURFACE INFORMATION | | | SURFACE | SURFACE | NO DIFFERENCE |
| | ROTATION | | | 0° | 0° | NO DIFFERENCE |
| | SCALING UP/DOWN | | | ReduceToFit | ReduceToFit | NO DIFFERENCE |
| | IMAGE POSITION | OFFSET | | x WHEREIN 0≤x≤Xa | x WHEREIN 0≤x≤Xa | NO DIFFERENCE |
| | | | | y WHEREIN 0≤y≤Ya | y WHEREIN 0≤y≤Ya | NO DIFFERENCE |
| | | POSITIONAL ADJUSTMENT INFORMATION | | CENTER | CENTER | NO DIFFERENCE |
| | LAYOUT INFORMATION | CUSTOM IMPOSITION ARRANGEMENT | | 1×1 up | 1×1 up | NO DIFFERENCE |
| | | PAGE NUMBER | | PAGE NUMBER TYPE 1 | PAGE NUMBER TYPE 1 | NO DIFFERENCE |
| | | IMPOSITION INFORMATION | | Normal | Normal | NO DIFFERENCE |
| | | PAGE ORDER INFORMATION | | PAGE ORDER TYPE 1 | PAGE ORDER TYPE 1 | NO DIFFERENCE |
| | | CREEP POSITIONAL ADJUSTMENT | | x WHEREIN 0≤x≤CXa | x WHEREIN 0≤x≤CXa | NO DIFFERENCE |
| | | | | y WHEREIN 0≤y≤CYa | y WHEREIN 0≤y≤CYa | NO DIFFERENCE |
| | MARGIN INFORMATION | | | x WHEREIN 0≤x≤Ma | x WHEREIN 0≤x≤Ma | NO DIFFERENCE |
| | CROP MARK INFORMATION | CENTER CROP MARK INFORMATION | | NONE | NONE | NO DIFFERENCE |
| | | CORNER CROP MARK INFORMATION | | NONE | NONE | NO DIFFERENCE |
| FINISHING INFORMATION | COLLATE INFORMATION | | | NONE | NONE | NO DIFFERENCE |
| | STAPLE/BIND INFORMATION | | | NONE | NONE | NO DIFFERENCE |
| | PUNCH INFORMATION | | | NONE | NONE | NO DIFFERENCE |
| | FOLDING INFORMATION | | | NONE | NONE | NO DIFFERENCE |
| | TRIMMING INFORMATION | | | Fore Edge 0.196[mm] | Fore Edge 0.195[mm] | DIFFERENT |
| | OUTPUT TRAY INFORMATION | | | OutputTray1 | OutputTray1 | NO DIFFERENCE |
| | INPUT TRAY INFORMATION | | | InputTray0 | InputTray0 | NO DIFFERENCE |
| | COVER SHEET INFORMATION | | | NONE | NONE | NO DIFFERENCE |
| | | | | TOTAL NUMBER OF JOB ATTRIBUTES WITHIN DFE | | 26 |
| | | | | NUMBER OF MATCHED ATTRIBUTES | | 25 |
| | | | | NUMBER OF MISMATCHED ATTRIBUTES | | 1 |
| | | | | MISMATCH PERCENTAGE | | 4% |

| PAGE | NUMBER OF MISMATCHED PIXEL AREAS | NUMBER OF MISMATCHED PIXELS | MISMATCHED PIXEL PERCENTAGE |
|---|---|---|---|
| 1 | 0 | 0 | 0 |
| 2 | 0 | 0 | 0 |
| 3 | 1 | 100 | 5% |
| 4 | 1 | 500 | 25% |
| 5 | 0 | 0 | 0 |
| TOTAL | 2 | 600 | 6% |

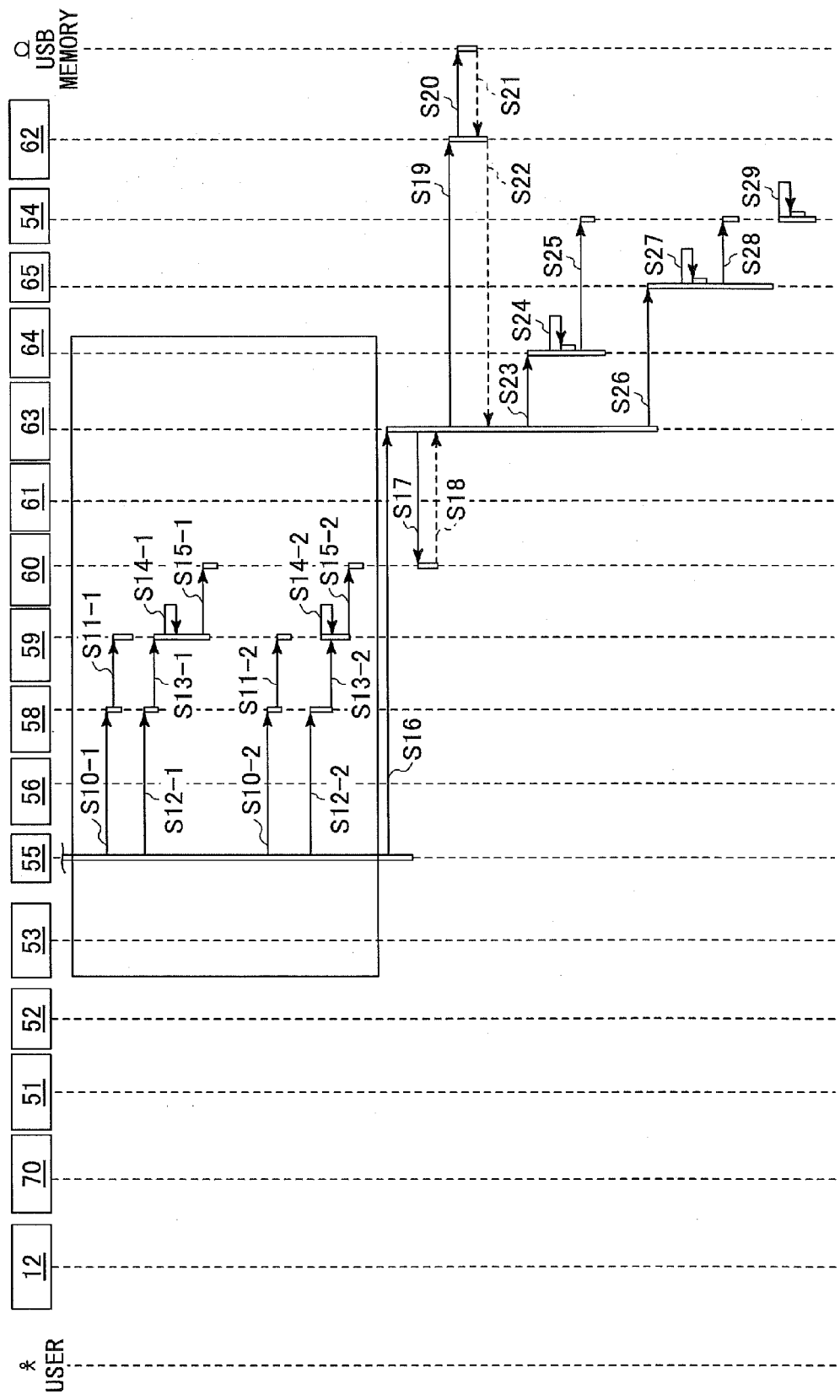

INFORMATION PROCESSING APPARATUS, INFORMATION PROCESSING METHOD, AND PROGRAM

CROSS-REFERENCE TO RELATED APPLICATIONS

The present application claims priority to and incorporates by reference the entire contents of Japanese Patent Application No. 2014-050520 filed in Japan on Mar. 13, 2014 and Japanese Patent Application No. 2015-036556 filed in Japan on Feb. 26, 2015.

BACKGROUND OF THE INVENTION

1. Field of the Invention

The present invention relates to an information processing apparatus, an information processing method, and a program that use a print job including setting information and printing data and generate drawing data.

2. Description of the Related Art

There is what is called production printing for printing and binding a huge amount of commercial documents (see Patent Document 1, for example). Patent Document 1 discloses a printing system capable of notifying a user of whether a post process is available in consideration of an entire portion of the printing system.

In the production printing, a printing process is often handled as a workflow. There is a trend of opening printing workflows. Through opening, it is possible for software (a workflow application described below) and printing devices of various companies to describe setting of print jobs in a main process of printing in a common description method. A standard format called Job Definition Format (JDF) is known as a format for describing an entire portion of the printing workflow.

The printing workflow has various types of processes such as creation of a document or contents, specification of a printing method, printing, and post processing. Although each process is performed by various workflow applications and printing devices, the JDF enables cooperation between the printing devices, printing process management, and the like irrespective of difference of the workflow applications and difference of manufacturers of the printing devices.

However, each workflow application or printing device may extend the JDF and the JDF created by the workflow application of a company may include a description specific to the workflow application. In this case, it is known that there may be a situation where a workflow application or a printing device positioned downstream cannot analyze or process the JDF.

In order to solve such a problem, the workflow application or the printing device positioned downstream may convert a JDF created by the workflow application positioned upstream into a format that can be handled by the workflow application or the printing device positioned downstream.

FIG. 1-(a) is an example of a diagram schematically illustrating conversion of a JDF. A workflow application of company A (hereafter simply referred to as "application 12") creates a print job 1001 including a JDF 81a in a company A form and Page Description Language (PDL) 82. While the PDL is a language for specifying drawing contents of a page image (rasterized image), the PDL here means printing data described in the PDL. Examples of the PDL include Portable Document Format (PDF), PostScript, PCL, RPDL, and the like.

A user of a Digital Front End (DFE) 32 of company C converts the JDF 81a in the company A form into a JDF 81c in a company C form by conversion software 70. In accordance with this, a print job 1002 having the JDF 81c in the company C form and the PDL 82 is obtained. The conversion software 70 is created by company C or created for company C. Accordingly, the DFE 32 of company C can analyze the JDF 81c in the company C form and perform a downstream process (such as rendering). The DFE 32 is a printing device positioned downstream relative to the application 12.

However, since it is necessary for the user of the DFE 32 of company C to convert the JDF using the conversion software 70, a conversion function may be incorporated into the DFE 32.

FIG. 1-(b) is an example of a diagram showing the DFE 32 of company C having a function 71 of converting a JDF. The DFE 32 of company C has this conversion function 71 that is the same as the conversion software 70 and converts the JDF 81a in the company A form into job attributes 1005 within DFE (the numerals 1005 are omitted hereafter). The "job attributes within DFE" are obtained by converting the JDF 81a in the company A form into setting information about printing supported by an RIP engine of company C. An RIP engine 59 of company C is a rendering engine that generates raster data. The RIP engine 59 of company C uses the "job attributes within DFE" and a "PDL" to perform rendering.

However, since users have used the JDF 81c in the company C form converted by the conversion software 70 upon rendering in the past, the users may wish to confirm whether the conversion function 71 of the DFE 32 is the same as the conversion software 70. Further, if the users start printing on a sheet without confirming whether a print result 1003 via the conversion software 70 is the same as a print result 1004 via the conversion function 71 of the DFE 32 of company C, this may result in unnecessary print costs.

[Patent Document 1] Japanese Laid-Open Patent Application No. 2012-238188

SUMMARY OF THE INVENTION

It is a general object of at least one embodiment of the present invention to provide an information processing apparatus for supporting judgment of whether two print results are the same.

In an embodiment, an information processing apparatus for generating drawing data by using a print job including setting information and printing data is provided. The information processing apparatus includes a conversion unit that converts first setting information into first apparatus setting information in accordance with a form of the first setting information and converts second setting information, converted from the first setting information, into second apparatus setting information in accordance with a form of the second setting information; an information obtaining unit that obtains the second apparatus setting information; and a first comparison result information creating unit that creates apparatus setting information comparison result information by comparing the first apparatus setting information with the second apparatus setting information.

According to an embodiment of the present invention, it is possible to provide an information processing apparatus for supporting judgment of whether two print results are the same.

BRIEF DESCRIPTION OF THE DRAWINGS

Other objects and further features of embodiments will become apparent from the following detailed description when read in conjunction with the accompanying drawings, in which:

FIG. 6A is an example of a diagram illustrating a part of a JDF description;

FIG. 6B is an example of a diagram illustrating a part of a JDF description;

FIG. 6C is an example of a diagram illustrating a part of a JDF description;

FIG. 7A is a diagram showing an example of a conversion table;

FIG. 7B is a diagram showing an example of a conversion table;

FIG. 7C is a diagram showing an example of a conversion table;

FIG. 9 is a diagram showing an example of job attributes within DFE;

FIG. 10 is a diagram showing an example of an RIP Parameter List;

FIG. 14 is a diagram showing an example of job attributes within DFE comparison information;

FIG. 17 is a diagram showing an example of RIP result comparison information;

FIG. 23 is an example of a sequence diagram of a printing system if a comparison mode is set.

DESCRIPTION OF THE PREFERRED EMBODIMENTS

Figure 1:
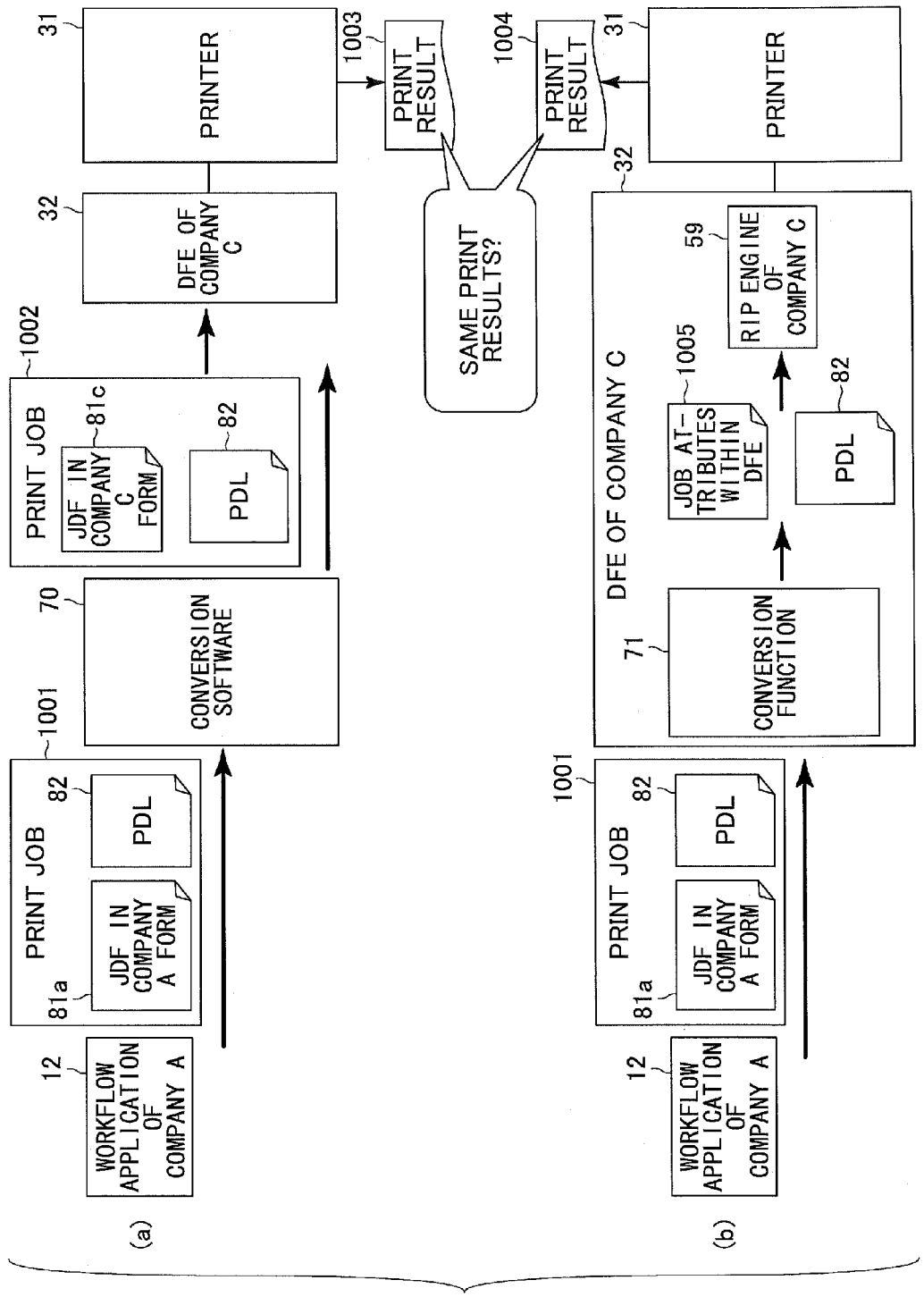
FIG. 1 is an example of a diagram schematically illustrating conversion of a JDF.

In the following, embodiments of the present invention will be described with reference to the accompanying drawings. In FIG. 1, if a user wishes to confirm whether the conversion function 71 of the DFE 32 of company C is the same as the conversion software 70, the following cases A and B are considered.

A. Two print results 1003 and 1004 are inspected using an image inspection device, for example. However, confirmation using the image inspection device has the following defects.

(1) Since inspection is performed on each image, it is impossible to perform inspection once post-processing such as stapling is made.

(2) It is impossible to inspect stapling positions or types.

B. The user checks through visual inspection, for example. However, this case has the following defects.

(1) A slight difference of color or a font may be overlooked.

(2) If there are lots of "rendering effects", it is difficult to inspect all of them.

Accordingly, the present embodiment supports the user to judge whether the conversion function 71 of the DFE 32 of company C is the same as the conversion software 70 in the following manner.

Figure 2:
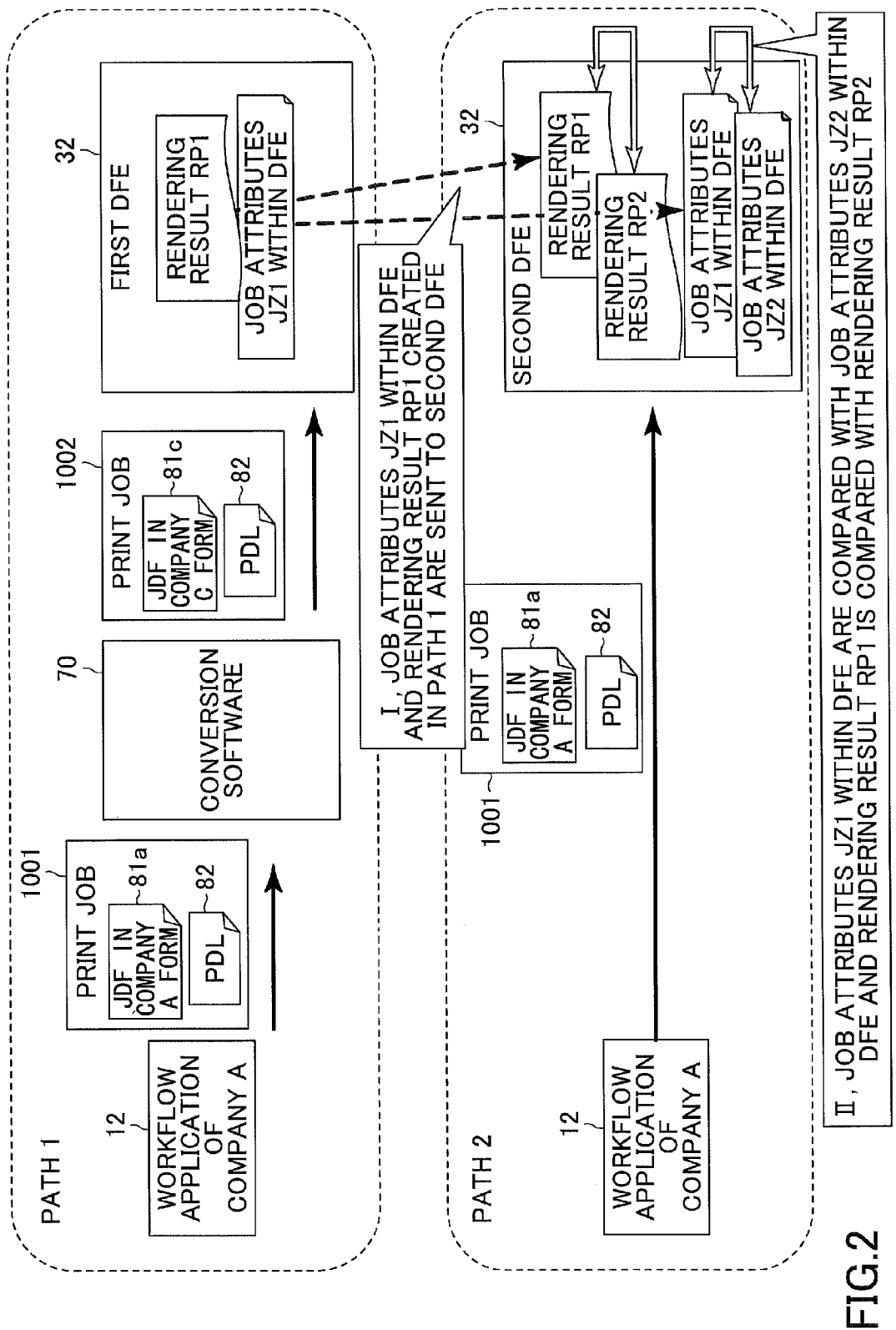
FIG. 2 is an example of a diagram illustrating determination of whether a conversion function of a DFE of company C is the same as conversion software.

FIG. 2 is an example of a diagram illustrating determination of whether the conversion function 71 of the DFE 32 of company C is the same as the conversion software 70. In the present embodiment, raster data is generated from the same print job 1001 in two paths. The DFE 32 in path 1 is referred to as a "first DFE" and the DFE 32 in path 2 is referred to as a "second DFE".

(1) Path 1
Workflow Software of Company A→Conversion Software→First DFE

The first DFE corresponds to the DFE 32 shown in FIG. 1-(*a*) and renders the JDF 81*c* in the company C form and the PDL 82 (the numerals 82 are omitted hereafter). The first DFE creates a "rendering result" obtained by rendering the JDF 81*c* in the company C form and the PDL and also creates "job attributes within DFE". The "job attributes within DFE" are obtained by converting each attribute of the JDF into a form that is handled by the RIP engine 59 of company C. In FIG. 2, the "job attributes within DFE" are created from the JDF 81*c* in the company C form. In FIG. 2, the "job attributes within DFE" are created from the JDF 81*a* in the company A form. In the following, the "rendering result" in Path 1 is referred to as "a rendering result RP1" and the "job attributes within DFE" in Path 1 are referred to as "job attributes JZ1 within DFE".

(2) Path 2
Workflow Software of Company A→Second DFE

The second DFE corresponds to the DFE 32 in the present embodiment and has a function of comparing two "rendering results" and two "job attributes within DFE" from the first DFE and the second DFE. The second DFE has the conversion function 71 of FIG. 1-(*b*) and converts the JDF 81*a* in the company A form into "job attributes within DFE" that are supported by the RIP engine 59 of company C. Further, the second DFE creates a "rendering result" by rendering the "job attributes within DFE" and the PDL. In the following, the "rendering result" in Path 2 is referred to as a "rendering result RP2" and the "job attributes within DFE" in Path 2 are referred to as "job attributes JZ2 within DFE".

In this manner, the job attributes JZ1 within DFE and the job attributes JZ2 within DFE are created and the rendering result RP1 and the rendering result RP2 are created.

I. The second DFE obtains the job attributes JZ1 within DFE and the rendering result RP1.

II. The second DFE compares the job attributes JZ1 within DFE with the job attributes JZ2 within DFE and compares the rendering result RP1 with the rendering result RP2.

Although the "job attributes JZ1 and JZ2 within DFE" include attributes set in a JDF, if corresponding attributes of the same item are equal between the job attributes JZ1 within DFE and the job attributes JZ2 within DFE, it is highly likely that the same print results will be obtained. Further, since attributes related to post-processing such as stapling are set, it is possible to inspect whether two "job attributes within DFE" are the same before stapling is performed. Further, it is possible to inspect stapling positions and a stapling type by comparing the job attributes JZ1 within DFE with the job attributes JZ2 within DFE.

Further, if the DFE 32 rather than a human compares the rendering result RP1 with the rendering result RP2, it is possible to reduce a risk of overlooking a slight difference of color or a font. Further, even if there are lots of "rendering effects", it is possible to inspect all of them.

(Configuration Example)

Figure 3:
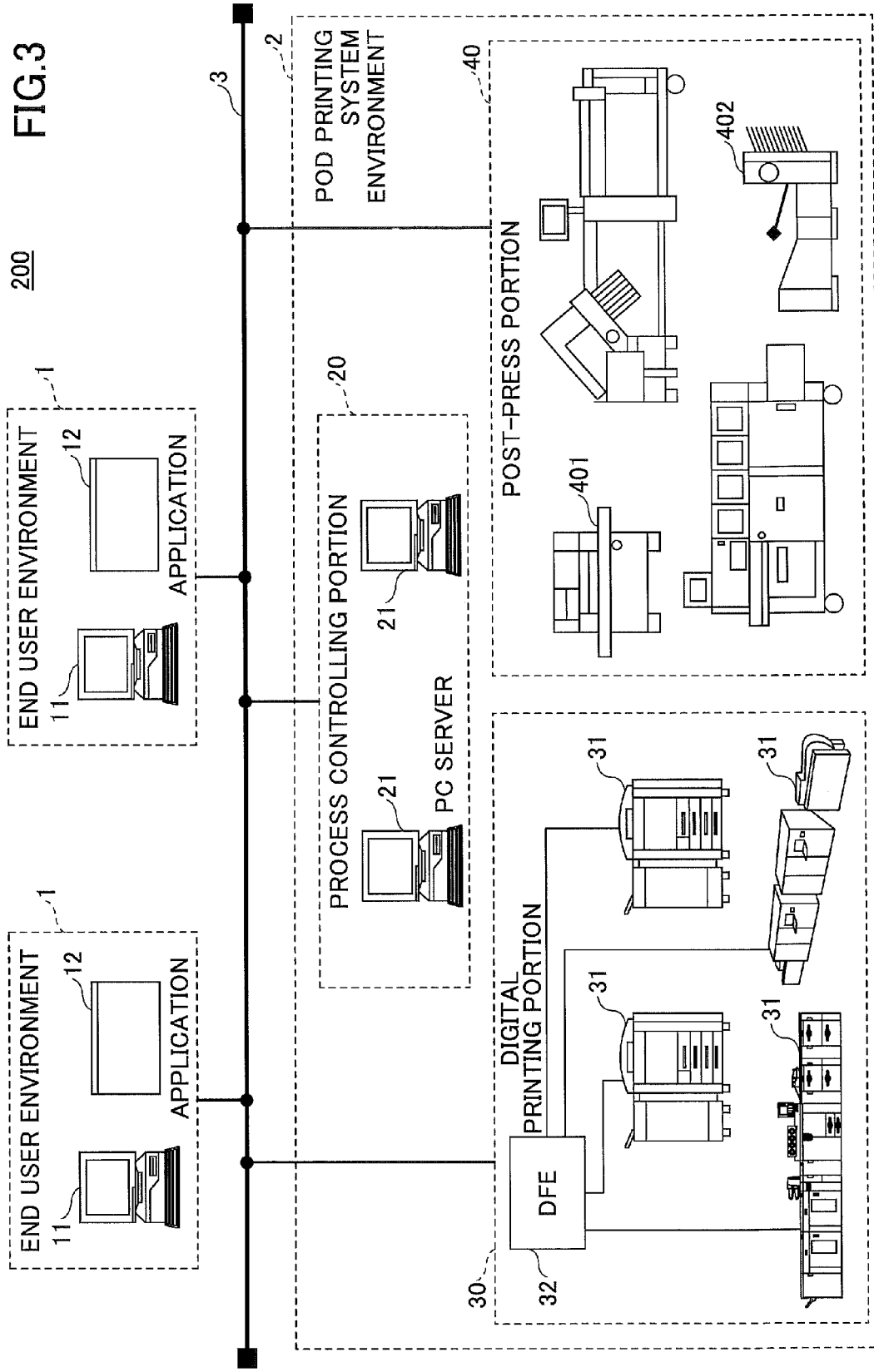
FIG. 3 is an example of a diagram showing an entire configuration of a printing system.

FIG. 3 is an example of a diagram showing an entire configuration of a printing system 200 according to the present embodiment. The printing system 200 according to the present embodiment includes at least one end user environment 1 and a Print On Demand (POD) printing system environment 2 connected via a network 3 such as a LAN or the Internet.

In the end user environment 1, a client Personal Computer (PC) 11 is disposed. A workflow application for POD printing operation (hereafter simply referred to as "application") 12 is installed on the client PC 11, so that the client PC 11 is capable of creating a print job when a user operation is received.

Further, in the present embodiment, a PC server 21, for example, is assumed to execute the conversion software 70 to convert a JDF in a company A form into a JDF in a company C form (the PC server 21 is an example of an "external device" in the Claims). Other than the PC server 21, a PC capable of executing the conversion software 70 may convert the JDF in the company A form into the JDF in the company C form.

The application 12 can perform an aggregate printing function (Number Up impose function) to attach a plurality of logical page images to a sheet surface and an image editing function to add a header, a footer, a page number, and the like. Further, the application 12 can specify a perforation (punch) instruction for bookbinding and an instruction such as a staple fixation (staple) instruction. These instructions or settings are described in a JDF. The JDF is also referred to as a "job ticket", an "operation instruction", a "printing instruction", and the like.

The POD printing system environment 2 includes a process controlling portion 20, a digital printing portion 30, and a post-press portion 40 connected via the network 3. In the POD printing system environment 2, the process controlling portion 20 sends an instruction to perform an operation to the digital printing portion 30 and the post-press portion 40 and manages workflows of the POD printing system environment 2 in an integrated manner.

The process controlling portion 20 receives a print job (JDF and PDL) from the end user environment 1 and stores the print job. The JDF is an example of "setting information" in the Claims and the PDL is an example of "printing data" in the Claims. While the PDL is a language for specifying drawing contents of a page image (rasterized image), the PDL here means data described in the PDL. Examples of the PDL include Portable Document Format (PDF), PostScript, PCL, RPDL, and the like.

The process controlling portion 20 also assembles operations in each process as a workflow based on a print job from the end user environment 1 and efficiently schedules operations of the digital printing portion 30, the post-press portion 40, and an operator. When an error occurs in automatic operation, the process controlling portion 20 can notify the operator where necessary. In general, the process controlling portion 20 is configured to include at least one PC server 21.

The process controlling portion 20 transmits a print job to the digital printing portion 30 to cause the digital printing portion 30 to perform printing. Further, printed matter is conveyed to the post-press portion 40 and the post-press portion 40 performs bookbinding, for example, by an instruction from the process controlling portion 20. The print job may be transmitted to the post-press portion 40 directly from the digital printing portion 30.

The digital printing portion 30 is configured to include various types of printers 31 (printer devices such as a printer for production, a high-speed color inkjet printer, and a color/monochrome MFP). In the digital printing portion 30, a DFE 32 is disposed. The DFE 32 is also referred to as a "print processing device" or a "printer controlling device" and controls printing by the printers 31. The DFE 32 may be separate from the printers 31 as shown in the drawing or may be integrated with any of the printers 31. When the DFE 32 obtains a print job from the process controlling portion 20, the DFE 32 uses a JDF and a PDL to generate raster data (an example of "drawing data" in the Claims) by which the printer 31 forms an image using toner or ink, and the DFE 32 transmits the raster data to the printer 31.

The digital printing portion 30 includes various types of printers 31. The digital printing portion 30 may include the printer 31 directly connected to a finisher (post-processing device) for performing post processing such as folding, saddle stitching bookbinding, case binding, punching, and the like on printed recording paper.

The post-press portion 40 is configured to include post-processing devices such as a folder, a saddle stitching bookbinder, a case binder, a cutter, an inserter, a collator, and the like in accordance with an operation instruction of printed matter (post-press job) received from the process controlling portion 20. The post-press portion 40 performs finishing processing such as folding, saddle stitching bookbinding, case binding, cutting, inserting, collating, and the like on printed matter output from the digital printing portion 30. The post-press portion 40 includes post-processing devices for performing post processing after digital printing such as a stapler 401, a puncher 402, and the like.

An end user in the end user environment 1 uses the application 12 for POD printing operations from the client PC 11 to cause image editing, imposition, text insertion, post processing, and the like to be performed and transmits a print job to the process controlling portion 20 in the POD printing system environment 2.

In accordance with a JDF, the PC server 21 of the process controlling portion 20 instructs the digital printing portion 30 to perform printing and instructs the post-press portion 40 to perform a post process.

(Hardware Configuration)

In the present embodiment, a print job created in the end user environment 1 may be directly received by the DFE 32 or may be received by the process controlling portion 20 and the process controlling portion 20 may transmit the print job to the DFE 32.

Figure 4:
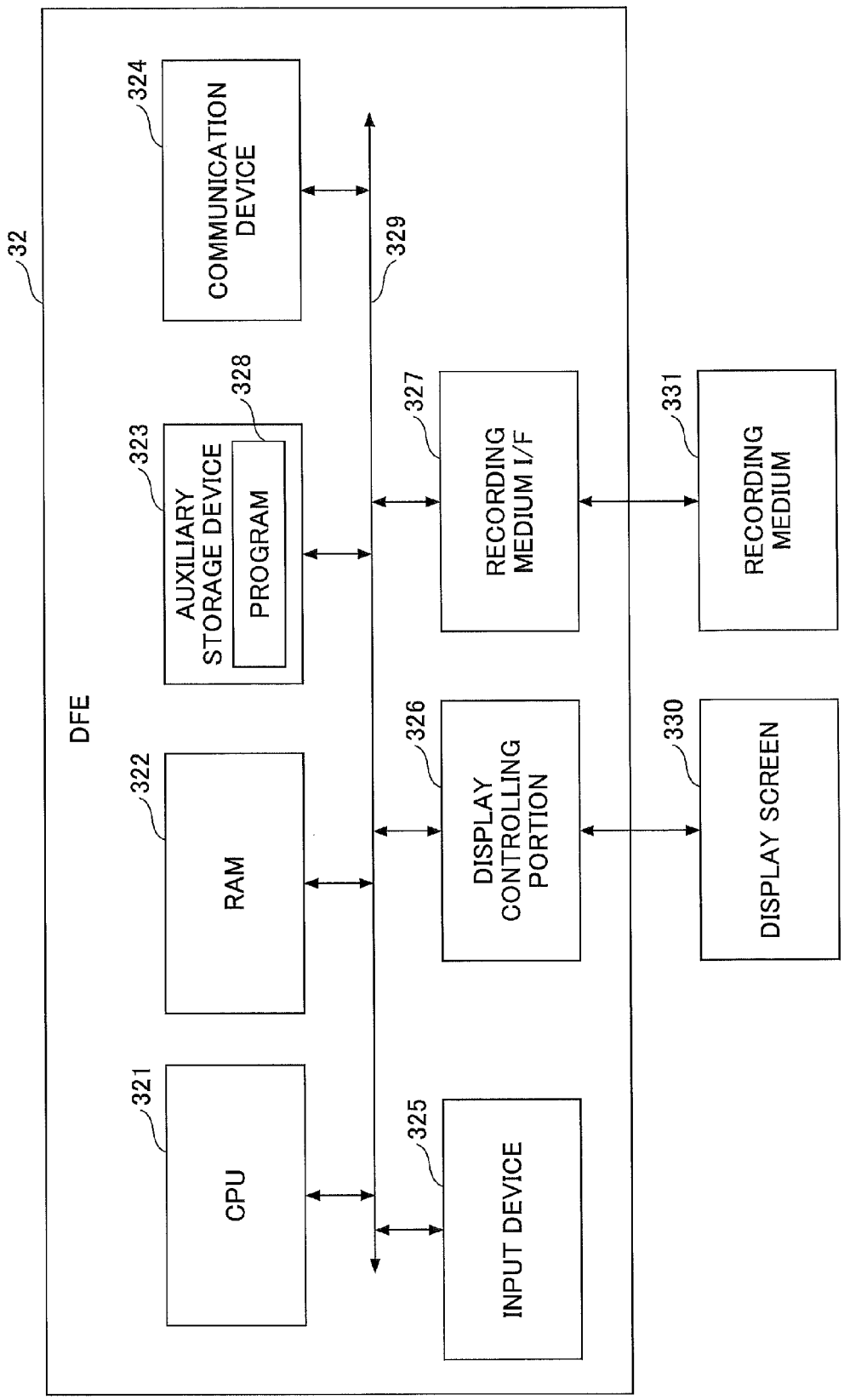
FIG. 4 is an example of a hardware configuration diagram of a DFE.

FIG. 4 is an example of a hardware configuration diagram of the DFE 32. The DFE 32 is realized by a hardware configuration as shown in FIG. 4, for example. In other words, the DFE 32 has a function of an information processing device (computer). The DFE 32 includes a CPU 321, a RAM 322, an auxiliary storage device 323, a communication device 324, an input device 325, a display controlling portion 326, and a recording medium I/F 327 interconnected via a bus 329.

The CPU 321 controls the entire hardware portion of the DFE 32 by executing a program with the RAM 322 functioning as working memory. The auxiliary storage device 323 is a non-volatile memory such as a Hard Disk Drive (HDD) or a Solid State Drive (SSD). The auxiliary storage device 323 stores a program 328 that has a function related to converting a print job.

The communication device 324 is a modem, a LAN card, or the like and is connected to the network 3 to communicate with the end user environment 1, the process controlling portion 20, or the post-press portion 40. The communication device 324 also communicates with the printers 31. The input device 325 is a keyboard or a mouse, for example, and accepts a user operation. The display controlling portion 326 is connected to a display screen 330 and performs rendering on the display screen 330 by an instruction from the CPU 321. The display screen 330 may include a touch panel.

A portable recording medium can be attached to or removed from the recording medium I/F 327. The recording medium I/F 327 writes data in a recording medium 331 by an instruction from the CPU 321 or reads out data from the recording medium 331. The recording medium 331 may be one of various types including a medium for optical, electric, or magnetic recording such as a CD-ROM, an optical disk, a USB memory, and an SD card and a semiconductor memory for electrically recording information such as a flash memory.

The program 328 is stored in the recording medium 331 and delivered or the program 328 is downloaded from a server (not shown) via the network 3. The program 328 is software to implement functions of the DFE 32 described below.

Hardware configurations of the client PC 11 in the end user environment 1 and the PC server 21 in the process controlling portion 20 can be realized by the same configuration as in FIG. 4. When the PC server 21 executes the conversion software 70, the program 328 serves as the conversion software 70.

(Functions of DFE)

The DFE 32 in the present embodiment is described in the following. The DFE 32 described below refers to the second DFE shown in FIG. 2 and has the function of comparing "job attributes within DFE" and "rendering results". The second DFE converts a JDF in a company C form input via the conversion software 70 into job attributes JZ1 within DFE and obtains a rendering result RP1 from the job attributes JZ1 within DFE and a PDL.

Figure 5:
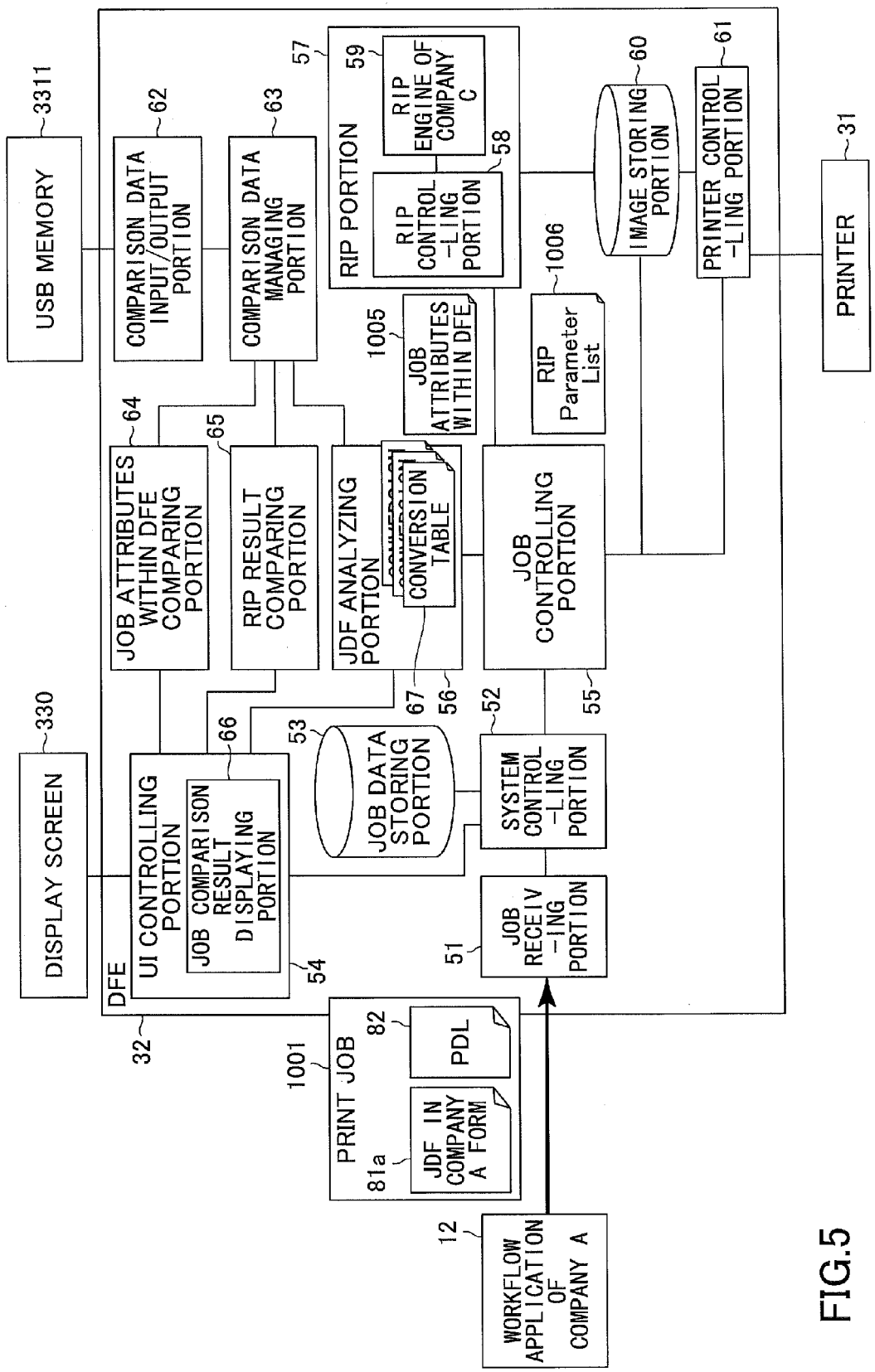
FIG. 5 is an example of a functional block diagram of a DFE.

FIG. 5 is an example of a functional block diagram of the DFE 32. The DFE 32 performs job control, Raster Image Processor (RIP) control, and printer control in a printing workflow. In this manner, the DFE 32 operates as a server to provide the end user environment 1 or the process controlling portion 20 with a main function of printing. The job control refers to control on a series of procedures of a print job such as receiving the print job, analyzing a JDF, creating raster data, printing by a printer, and the like. The RIP control refers to control to create an "RIP Parameter List" 1006 (the numerals 1006 are omitted hereafter) and cause an RIP engine 59 of company C to create raster data after "job attributes within DFE" described below are created. The "RIP" is an acronym of "Raster Image Processor" and refers to a dedicated IC for generating raster data and to generation of raster data. The printer control refers to control to transmit the raster data and a part of the "job attributes within DFE" ("Finishing information" described below) to the printer and to cause the printer to perform printing.

The DFE 32 includes a job receiving portion 51, a system controlling portion 52, a UI controlling portion 54, a job controlling portion 55, a JDF analyzing portion 56, an RIP portion 57, an RIP controlling portion 58, the RIP engine 59 of company C, a printer controlling portion 61, an RIP result comparing portion 65, a job attributes within DFE comparing portion 64, a comparison data managing portion 63, and a comparison data input/output portion 62. These are implemented when the CPU 321 executes the program 328 and cooperates with various types of hardware including those shown in FIG. 5. The DFE 32 further includes a job data storing portion 53 and an image storing portion 60 configured in the auxiliary storage device 323, the RAM 322, the recording medium 331, or the like.

The job receiving portion 51 receives, via the network 3, a print job from the application 12 or the PC server 21 that executes the conversion software 70. The job receiving portion 51 associates the print job with a unique job number, a reception date and time, an end date and time, a status, and the like and stores them in a log, for example. Other than being input from the application 12, the print job may be input from a USB memory or the like. In the present embodiment, a JDF is assumed to be included in the print job. If the JDF is not included, the job receiving portion 51 creates a dummy JDF in order to enable rendering.

The system controlling portion 52 stores the received print job in the job data storing portion 53 or outputs the received print job to the job controlling portion 55. For example, if the DFE 32 is set in advance so that a print job is stored in the job data storing portion 53, the system controlling portion 52 stores the print job in the job data storing portion 53. Further, the JDF may describe whether to store a print job in the job data storing portion 53.

If a user operates such that contents of the print job stored in the job data storing portion 53 are displayed on the display screen 330, for example, the system controlling portion 52 outputs the JDF from the job data storing portion 53 to the UI controlling portion 54. If the user changes the JDF, the UI controlling portion 54 receives changed contents and the system controlling portion 52 stores the changed JDF in the job data storing portion 53 anew.

If the system controlling portion 52 receives an instruction to perform the print job from the user, the end user environment 1, or the process controlling portion 20, the system controlling portion 52 outputs the print job stored in the job data storing portion 53 to the job controlling portion 55. Further, if a printing time is set in the JDF, the system controlling portion 52 outputs the print job stored in the job data storing portion 53 to the job controlling portion 55 at the printing time.

The job data storing portion 53 is a storage area for storing a print job in this manner and is disposed in the auxiliary storage device 323 of the DFE 32 or the recording medium 331. The job data storing portion 53 may be disposed in a storage device (not shown) on a network.

The UI controlling portion 54 interprets a JDF and displays contents of a print job on the display screen 330. The UI controlling portion 54 includes a job comparison result displaying portion 66. The job comparison result displaying portion 66 displays, on the display screen 330 (an example of a "display device" in the Claims), "job attributes within DFE comparison information (an example of "apparatus setting information comparison result information" in the Claims)" obtained from the job attributes within DFE comparing portion 64 as a result of comparison between job attributes JZ1 within DFE and job attributes JZ2 within DFE. The job comparison result displaying portion 66 also displays, on the display screen 330, "RIP result comparison information (an example of "drawing data comparison result information" in the Claims)" obtained from the RIP result comparing portion 65 as a result of comparison between a rendering result RP1 and a rendering result RP2.

The job controlling portion 55 causes the RIP controlling portion 58 to generate raster data and causes the printer controlling portion 61 to perform printing. Specifically, the job controlling portion 55 first transmits the JDF of the print job to the JDF analyzing portion 56 and outputs a JDF converting request to the JDF analyzing portion 56.

The JDF analyzing portion 56 obtains the JDF and the JDF converting request from the job controlling portion 55. The JDF analyzing portion 56 analyzes a description of the JDF to determine a manufacturer of the application 12 that created the JDF.

The JDF analyzing portion 56 converts the JDF into "job attributes within DFE" using a conversion table 67 prepared for the manufacturer of the application 12. In other words, if the DFE 32 is created by company C, the JDF analyzing portion 56 coverts the JDF created by company A or B as well as by company C into "job attributes within DFE" that can be handled by the DFE 32 of company C. The "job attributes within DFE" is an example of "apparatus setting information" in the Claims and each item of the "job attributes within DFE" is an example of a "setting item" in the Claims.

When the JDF analyzing portion 56 creates the "job attributes within DFE", the JDF analyzing portion 56 sets a "RIP control mode" in the "job attributes within DFE". While the "RIP control mode" is described below, the "RIP control mode" has a "Page Mode" and a "Sheet Mode". Whether a print job of each company is created in the "Page Mode" or the "Sheet Mode" has been examined in advance. Accordingly, if the manufacturer of the application 12 that created the JDF is determined, the "RIP control mode" can be determined too. In the present embodiment, it is assumed that the DFE 32 handles setting of aggregate printing of a print job in the "Page Mode" (by default).

The job controlling portion 55 obtains the "job attributes within DFE" in accordance with this, converts the "job attributes within DFE" and a PDL into an "RIP Parameter List" and outputs the print job as the "RIP Parameter List" to the RIP controlling portion 58. The "RIP Parameter List" is a collection of information necessary to perform an RIP process by the RIP engine 59. From the information in the "RIP Parameter List", the job controlling portion 55 determines an instruction of the RIP process to the RIP engine 59. This instruction is referred to as an RIP command.

The "RIP Parameter List" includes the "RIP control mode". The RIP controlling portion 58 controls the RIP engine 59 of company C in accordance with the "RIP control mode". Accordingly, a sequence is determined by the "RIP control mode".

The "Page Mode" causes RIP processing for each page and generates raster data aggregated in a single sheet.

The "Sheet Mode" causes RIP processing for each part (correspond to each page part before being aggregated) of a single sheet in which a plurality of pages have been aggregated and generates raster data.

The RIP portion 57 includes the RIP controlling portion 58 and the RIP engine 59 of company C and generates raster data using the RIP controlling portion 58 and the RIP engine 59. In the present embodiment, while the DFE 32 includes only the RIP engine 59 of company C, the DFE 32 may include an RIP engine of company A and an RIP engine of company B.

The RIP controlling portion 58 refers to the "RIP Parameter List"; if the "RIP control mode" is the "Sheet Mode", the RIP controlling portion 58 outputs an RIP command to the RIP engine 59 of company C in accordance with the "Sheet Mode". In accordance with this, it is possible to eliminate a difference of print jobs.

The RIP engine 59 of company C is a rendering engine and generates raster data by performing rasterization in accordance with the RIP command.

The image storing portion 60 is a storage unit that stores generated raster data. The image storing portion 60 is installed in the auxiliary storage device 323, for example. The image storing portion 60 may be disposed on a storage device on a network.

The printer controlling portion 61 is connected to the printer 31. The printer controlling portion 61 performs printing by reading out the raster data stored in the image storing portion 60 and transmitting the raster data to the printer 31. The printer controlling portion 61 also performs a finishing process on the basis of the "Finishing information" obtained from the job controlling portion 55.

The printer controlling portion 61 communicates with the printer 31 using various types of communication standards and can obtain printer information. For example, CIP4 that has developed standards of printing workflows defines "DevCaps" as a JDF standard by which device specification information is sent to or received from a printer. Further, a method for collecting printer information using a communication protocol called Simple Network Management Protocol (SNMP) and a database called Management Information Base (MIB) is well known.

The RIP result comparing portion 65 compares a rendering result RP1 with a rendering result RP2 in each page and creates "RIP result comparison information" as a comparison result.

The job attributes within DFE comparing portion 64 compares job attributes JZ1 within DFE with job attributes JZ2 within DFE and creates "job attributes within DFE comparison information" as a comparison result.

The comparison data managing portion 63 manages the job attributes JZ1 within DFE, the job attributes JZ2 within DFE, the rendering result RP1, and the rendering result RP2 to be compared.

Figure 19:
FIG. 19 is a diagram showing an example of an operation mode setting screen displayed on a display screen.

The DFE 32 operates in three operation modes to realize comparison in a single DFE 32. As illustrated in FIG. 19, the operation modes are switched by a user, for example. One of the operation modes is a basic operation mode of the DFE 32 in which the printer controlling portion 61 prints raster data using the printer 31. This operation mode is referred to as a "normal mode". In the normal mode, no comparison is made between the job attributes JZ1 within DFE and the job attributes JZ2 within DFE or between the rendering result RP1 and the rendering result RP2.

Remaining two operation modes include a comparison data generation mode and a comparison mode for making a comparison between the job attributes JZ1 within DFE and the job attributes JZ2 within DFE and between the rendering result RP1 and the rendering result RP2. Functions of the comparison data managing portion 63 are different between the comparison data generation mode and the comparison mode. The difference between the two operation modes is described in detail in FIG. 11.

1. If system operation mode="comparison data generation mode"
(1) The comparison data managing portion 63 obtains and stores job attributes JZ1 within DFE from the JDF analyzing portion 56.
(2) The comparison data managing portion 63 obtains and stores a rendering result RP1 from the image storing portion 60.
(3) The comparison data managing portion 63 outputs the job attributes JZ1 within DFE and the rendering result RP1 to the comparison data input/output portion 62.

2. If system operation mode="comparison mode"
(1) The comparison data managing portion 63 obtains job attributes JZ2 within DFE from the JDF analyzing portion 56.
(2) The comparison data managing portion 63 obtains a rendering result RP2 from the image storing portion 60.
(3) The comparison data managing portion 63 obtains the job attributes JZ1 within DFE and the rendering result RP1 from the comparison data input/output portion 62.
(4) The comparison data managing portion 63 outputs the job attributes JZ1 within DFE and the job attributes JZ2 within DFE to the job attributes within DFE comparing portion 64.
(5) The comparison data managing portion 63 outputs the rendering result RP1 and the rendering result RP2 to the RIP result comparing portion 65.

Functions of the comparison data input/output portion 62 are different depending on operation modes.

1. If system operation mode="comparison data generation mode"
The comparison data input/output portion 62 stores the job attributes JZ1 within DFE and the rendering result RP1 obtained from the comparison data managing portion 63 in a USB memory 3311 connected to the DFE 32.

2. If system operation mode="comparison mode"
The comparison data input/output portion 62 reads out the job attributes JZ1 within DFE and the rendering result RP1 stored in the USB memory 3311 connected to the DFE 32 and outputs the job attributes JZ1 within DFE and the rendering result RP1 to the comparison data managing portion 63.

The USB memory is an example of the recording medium 331 and other recording medium may be employed. Further, the job attributes JZ1 within DFE and the rendering result RP1 may be stored in an internal storage device such as a RAM 322 or an auxiliary storage device 323 other than in an external recording medium for the DFE 32.

(JDF and Determination of Manufacturer of Application that Created JDF)

A JDF is described in Extensible Markup Language (XML). The XML is a standard of structured text for providing a meaning to tags and structuring a document.

FIGS. 6A-C are examples of a diagram illustrating a part of a JDF description. It is assumed that a JDF in FIG. 6A is created by an application 12 of company C. The JDF describes contents of an instruction for a print job. "JDF xmlns="http://www.CIP4.org/JDFSchema_1_1"" indicates a JDF ticket compliant with CIP4. "xmlns:C="www.ccc.com/schema/ccc"" indicates a JDF tag definition independently extended by each printing company or vendor which is not compliant with CIP 4. In this example, any tag starting with "C:" within a JDF is an extended tag. "ResourcePool" defines a collection of attributes to realize printing.

"LayoutPreparationParams" is one of attributes defined in the "ResourcePool" and defines attributes related to imposition. "ResourceLinkPool" defines a collection of references to attributes commonly used within the "ResourcePool" for specific ranges if attributes are different in the ranges within a job such as pages.

"ComponentLink" is one of definitions of references within the "ResourceLinkPool" and specifies a reference of an attribute related to an output product and information.

"Amount" specifies a number of copies.
"Rotate" specifies a rotation angle for an image.

FIG. 6B is an example of expansion by company A and FIG. 6C is an example of expansion by company B. In FIG. 6B, "xmlns:A="www.aaa.com/schema/aaa"" indicates that any tag starting with "A:" within the JDF is an extended tag of company A. In FIG. 6C, "xmlns:B="www.bbb.com/schema/bbb"" indicates that any tag starting with "B:" within the JDF is an extended tag of company B.

Accordingly, the JDF analyzing portion 56 can identify a manufacturer of the application 12 that created the JDF by referring to these descriptions of the JDF. It is possible to use the conversion table 67 mentioned below depending on the manufacturer of the application 12 to convert the JDF into "job attributes within DFE" that can be handled by the DFE 32 of company C.

In the present embodiment, if a JDF 81c converted by the conversion software 70 into a JDF in a company C form is input to the DFE 32 (operating as the first DFE), a conversion table 67 for company C is selected. Further, if a JDF 81a in a company A form is input to the DFE 32 (operating as the second DFE) without going through the conversion software 70, a conversion table 67 for company A is selected.

(Creation of Job Attributes within DFE)

Figure 8A:
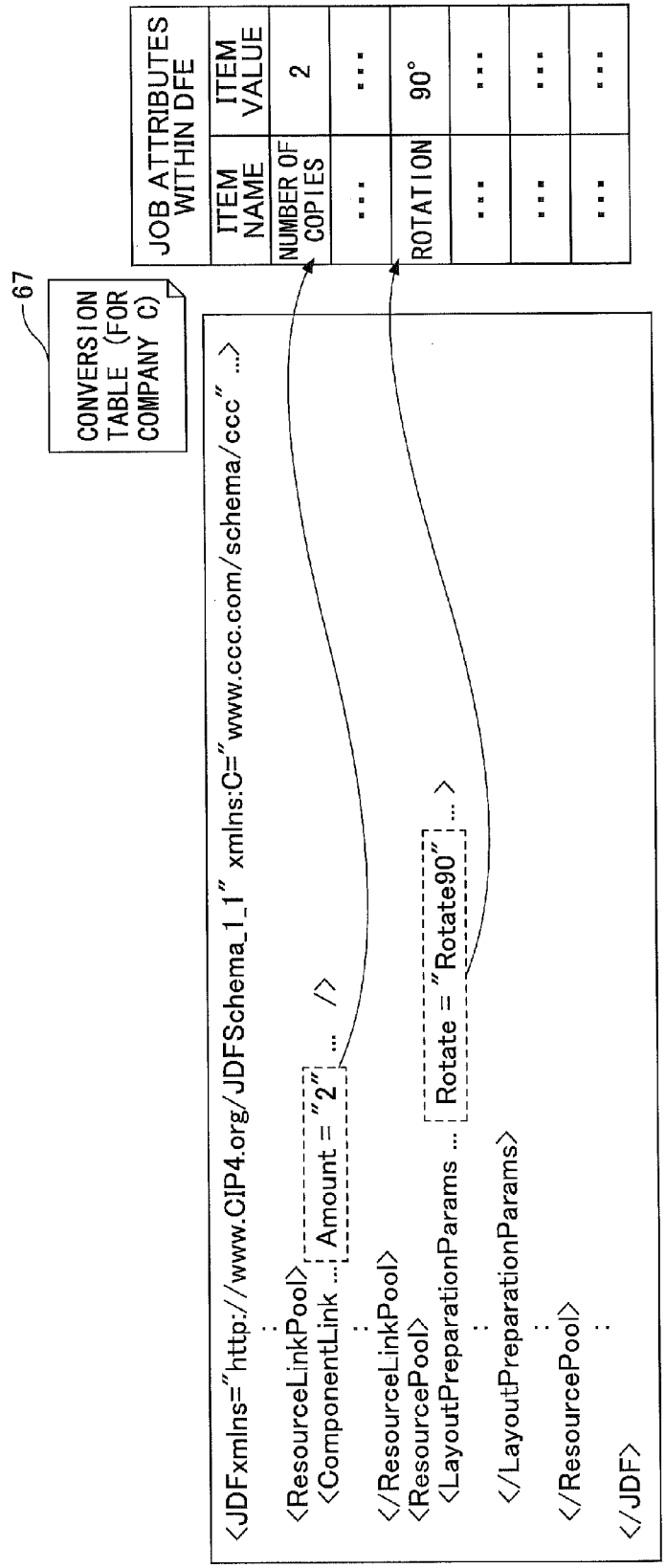
FIG. 8A is an example of a diagram illustrating creation of job attributes within DFE.
Figure 8B:
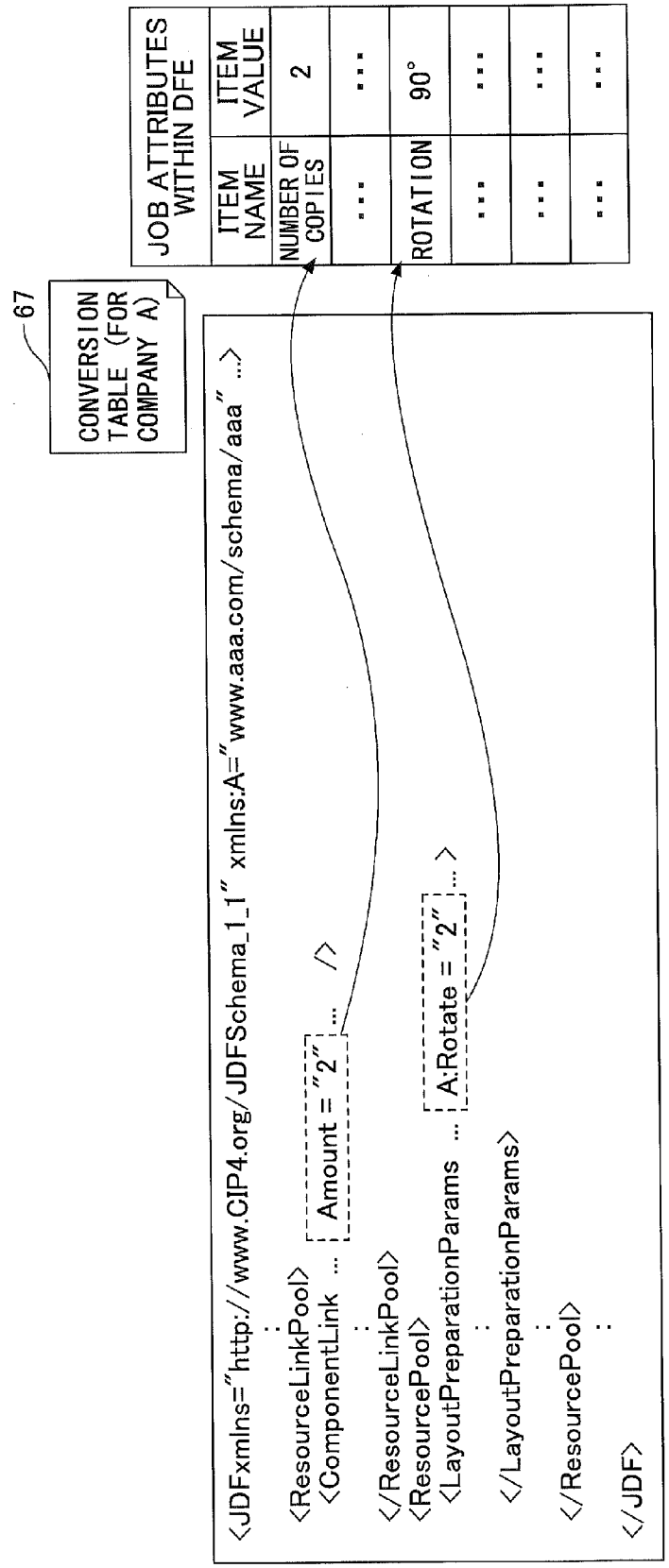
FIG. 8B is an example of a diagram illustrating creation of job attributes within DFE.
Figure 8C:
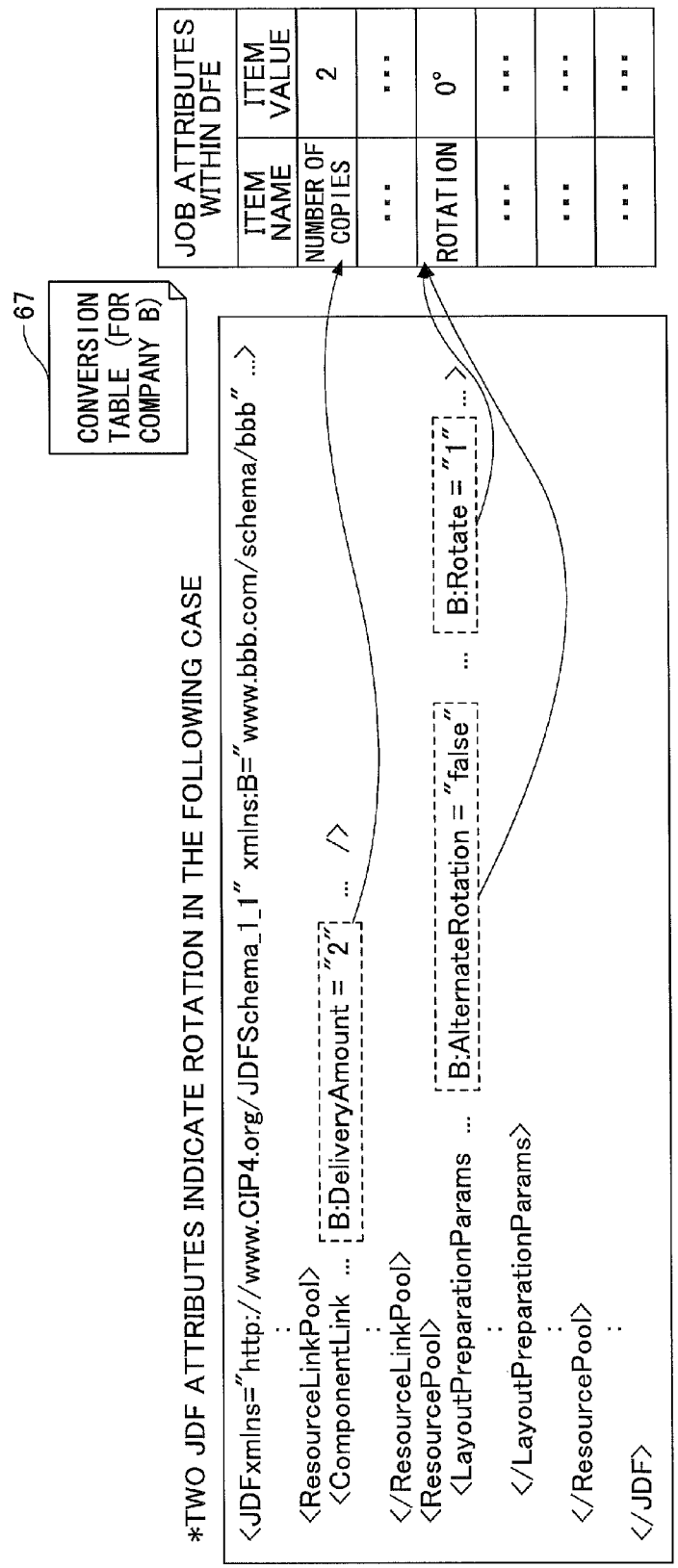
FIG. 8C is an example of a diagram illustrating creation of job attributes within DFE.

Creation of "job attributes within DFE" is described with reference to FIGS. 7A-C and 8A-C. FIGS. 7A-C show examples of the conversion table 67. FIGS. 8A-C are examples of a diagram illustrating the creation of "job attributes within DFE". The JDF analyzing portion 56 uses the conversion table 67 for a manufacturer of the application 12 that created a JDF (for an RIP engine assumed to process a print job) in order to convert the JDF into "job attributes within DFE".

FIG. 7A shows an example of a conversion table 67 for company C. The conversion table 67 for company C associates an attribute value of an attribute name "Amount" with an item value of an item name "the number of copies" and associates an attribute value of an attribute name "Rotate" with an item value of an item name "rotation".

Conversion is performed, as shown in FIGS. 8A-C, by referring to the conversion table 67 that associates an attribute within a tag of the JDF with an item of the "job attributes within DFE" and placing an attribute value of the JDF as an item value of the "job attributes within DFE".

The JDF analyzing portion 56 stores not only the conversion table 67 for company C but also a conversion table 67 for company A and a conversion table 67 for company B in advance. The JDF analyzing portion 56 may store a conversion table for company D in addition. FIG. 7B shows the conversion table 67 for company A and FIG. 7C shows the conversion table 67 for company B. The JDF analyzing portion 56 detects a description that specifies an extended tag from a JDF, identifies a manufacturer of the application 12, and uses the conversion table 67 for each manufacturer as mentioned above.

It is possible to convert a JDF of company A or B in the same manner. The conversion table 67 for company A associates an attribute value of an attribute name "A:Amount"

with an item value of an item name "the number of copies" and associates an attribute value of an attribute name "A:Rotate" with an item value of an item name "rotation". The conversion table 67 for company B associates an attribute value of an attribute name "B:DeliveryAmount" with an item value of an item name "the number of copies" and associates an attribute value of an attribute name "B:Rotate" with an item value of an item name "rotation". In the conversion table 67 for company B, rotation is enabled only if an attribute value of an attribute name "B:AlternateRotation" is "false". If the JDF is determined to be in the company A or B form, it is possible to create "job attributes within DFE" in the same manner as in a JDF in the company C form.

If the JDF analyzing portion 56 determines that a form of a print job in aggregate printing is created by the application 12 of a company different from its own company (company C), the JDF analyzing portion 56 sets "Sheet Mode" in an item "RIP control mode" of the "job attributes within DFE". If the application 12 is made by its own company or the form of a print job in aggregate printing is created by an application of the same company (company C), the JDF analyzing portion 56 sets "Page Mode" in the item "RIP control mode". Accordingly, the RIP controlling portion 58 can control an RIP command to be output to the RIP engine 59 of company C in accordance with the "RIP control mode".

FIG. 9 is a diagram showing an example of "job attributes within DFE". The "job attributes within DFE" is substantially divided into "Job information" related to performing a job, "Edit information" related to raster data, and "Finishing information" related to a finishing process.

In the Job information, an item "number of copies" specifies a number of copies.

In the Edit information, an item "direction information" specifies a direction of printing.

In the Edit information, an item "printing surface information" specifies a printing surface.

In the Edit information, an item "rotation" specifies a rotation angle of a page.

In the Edit information, an item "scaling up/down" specifies scaling and magnification.

In the Edit information, an item "image position: offset" specifies an offset of an image.

In the Edit information, an item "image position: positional adjustment information" specifies positional adjustment of an image.

In the Edit information, an item "layout information: custom imposition arrangement" specifies arrangement of a custom surface.

In the Edit information, an item "layout information: page number" specifies a page number of a single sheet.

In the Edit information, an item "layout information: imposition information" specifies information about surface arrangement.

In the Edit information, an item "layout information: page order information" specifies information about order of pages to be printed.

In the Edit information, an item "layout information: creep positional adjustment" specifies information about adjustment of a creep position.

In the Edit information, an item "margin information" specifies information about a margin such as a fit box or a gutter.

In the Edit information, an item "crop mark information: center crop mark information" specifies information about a center crop mark.

In the Edit information, an item "crop mark information: corner crop mark information" specifies information about a corner crop mark.

In the Finishing information, an item "Collate information" specifies information about whether printing is performed page by page or on a document basis if a plurality of copies of a document is to be printed.

In the Finishing information, an item "staple/bind information" specifies information about stapling or binding.

In the Finishing information, an item "punch information" specifies information about punching.

In the Finishing information, an item "folding information" specifies information about folding.

In the Finishing information, an item "trimming information" specifies information about trimming.

In the Finishing information, an item "output tray information" specifies information about an output tray.

In the Finishing information, an item "input tray information" specifies information about an input tray.

In the Finishing information, an item "cover sheet information" specifies information about a cover sheet.

Further, as shown in FIG. 9, the "RIP control mode" is set in the "job attributes within DFE". In the "RIP control mode", "Page Mode" or "Sheet Mode" is set.

(RIP Parameter List)

FIG. 10 is a diagram showing an example of the RIP Parameter List.

Input/output data type information specifies types of input or output data (for input or output data, not only a PDL but also a text file or image data such as JPEG are specified).

Reading/writing position specifying method information for input/output data specifies a method for specifying an offset (reading/writing position) of input or output data. For example, it is possible to specify the offset at a designated position, a current position, or an endmost position.

Reading/writing position information for input/output data specifies a current processing position for input and output data.

Reading/writing execution mode information for input/output data specifies an execution mode. For example, READ, WRITE, READ WRITE, or the like is specified.

Unit information (dimensions) specifies a unit to be used within the "RIP Parameter List". For example, "mm", "inch", "pel", "point", or the like is specified.

Compression method information for input/output data specifies a method for compressing input and output data. For example, "UNCOMPRESSED", "PACKBITS", or the like is specified.

"RIP control mode" specifies a control mode in aggregate printing. For example, "Page Mode" or "Sheet Mode" is specified.

An input/output image information portion has "information about an output image", "information about an input image", and "information about handling an image".

(Information about an Output Image)

Image format type specifies a type of an output image format. For example, raster or the like is specified.

Image format dimensions specify dimensions of an output image format.

Image format resolution specifies resolution of an output image format.

Image position specifies a position of an output image.

Color separation information specifies color separation. For example, "k", "cmyk", "separation", or the like is specified.

Color plane fit policy information specifies a method for expanding color planes.

Plane shift information specifies an amount of shift of a color plane.

Color bit number of an image format specifies a number of color bits of an output image format.

Image direction information specifies a direction of a page of an output image.

Image formation position information specifies positional information about a crop area.

Image formation size information specifies size information about a crop area.

Image formation method information specifies a policy of cropping.

Color ICC information specifies information about a color ICC profile.

Font substitution information specifies information about a substitute for a font.

Image formation origin information specifies an origin of image formation. For example, "center", "upper right", or the like is specified.

Flat K black information specifies information about flat K black.

Rendering information specifies information about rendering (rasterizing).

(Information about an Input Image)

Image format type specifies a type of an input image format. For example, raster or the like is specified.

Image format dimensions specify dimensions of an input image format.

Image format resolution specifies resolution of an input image format.

Image position specifies a position of an input image.

Input data specifies input data.

Page area information specifies a page number.

Color ICC information specifies information about a color ICC profile.

(Information about Handling an Image)

Scaling offset information specifies an offset of a scaling algorithm. For example, a horizontal offset, a vertical offset, or the like is specified.

Object region information specifies a width and a height of an object region.

Halftone information specifies an offset of halftone. For example, a horizontal offset, a vertical offset, or the like is specified.

Scaling algorithm information specifies a scaling method.

Information about PDL specifies a data area, size information, and a data arrangement method.

Data area specifies information about an area where a PDL is stored. Font information, information about a number of pages, and the like are included in the PDL present in the data area.

Size information specifies a size of the PDL.

Data arrangement method specifies a method for arranging data. For example, little endian, big endian, or the like is specified.

(Operations of DFE 32 in Comparison Data Generation Mode and Comparison Mode)

Figure 11:
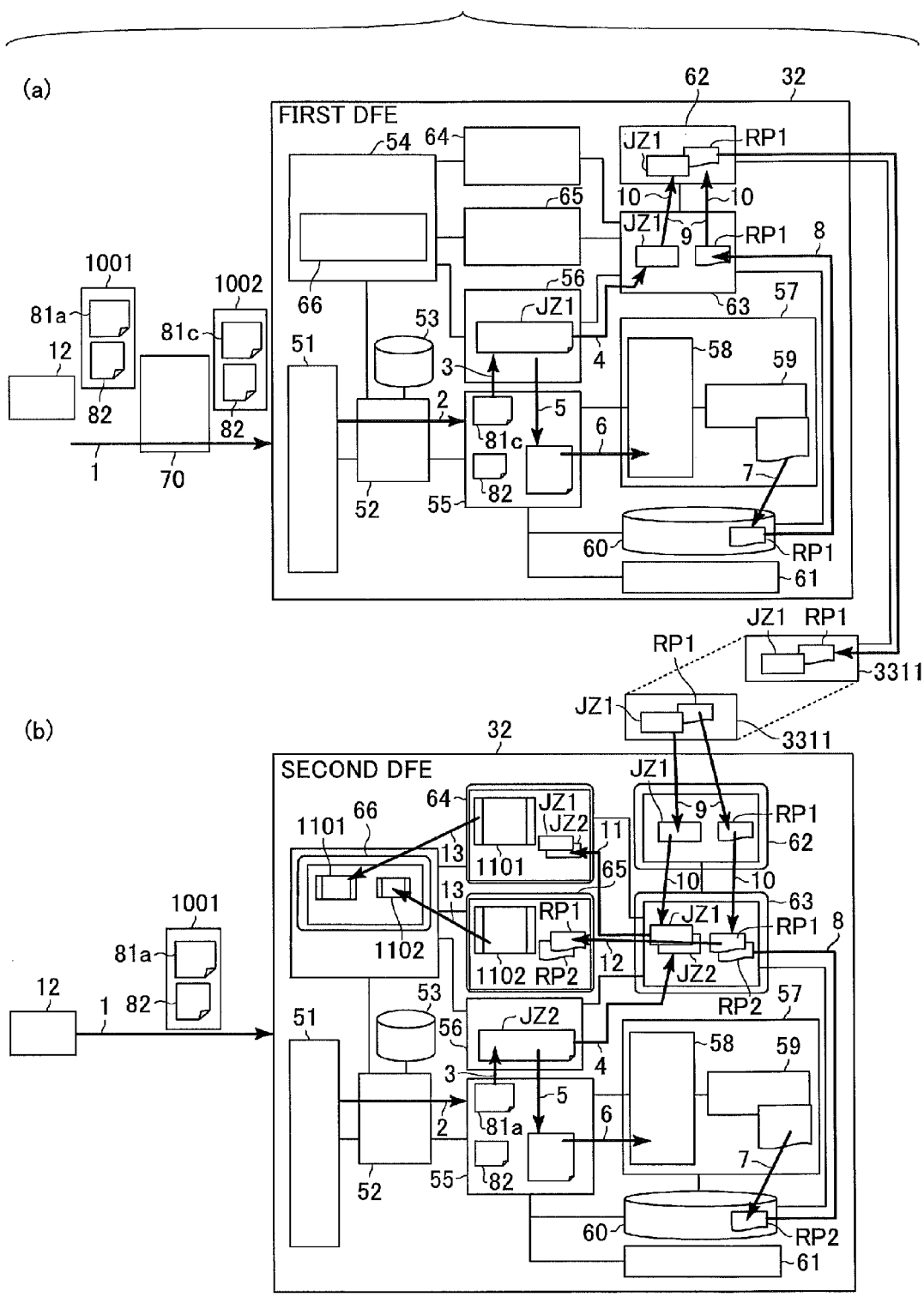
FIG. 11 is an example of a diagram illustrating an operation of a DFE in a comparison data generation mode and a comparison mode.

FIG. 11 is an example of a diagram illustrating operations of the DFE 32 in the comparison data generation mode and the comparison mode. FIG. 11-(a) shows operations of the comparison data generation mode and FIG. 11-(b) shows operations of the comparison mode. A configuration of the DFE 32 is the same in both modes.

Comparison Data Generation Mode

1. A user converts, by the conversion software 70, a PDL and a JDF 81a in the company A form created by the application 12 of company A into the PDL and a JDF 81c in the company C form to create a print job 1002.

2. The job receiving portion 51 outputs the print job 1002 to the system controlling portion 52. The system controlling portion 52 outputs the print job 1002 to the job controlling portion 55.

3. The job controlling portion 55 outputs the JDF 81c in the company C form to the JDF analyzing portion 56.

4. The JDF analyzing portion 56 analyzes the JDF 81c to determine that the JDF 81c is in the company C form. The JDF analyzing portion 56 converts the JDF 81c into job attributes JZ1 within DFE using the conversion table 67 for company C. The JDF analyzing portion 56 outputs the job attributes JZ1 within DFE to the comparison data managing portion 63.

5. The JDF analyzing portion 56 outputs the job attributes JZ1 within DFE to the job controlling portion 55.

6. The job controlling portion 55 converts the job attributes JZ1 within DFE and the PDL into an "RIP Parameter List" and outputs the "RIP Parameter List" to the RIP controlling portion 58.

7. The RIP controlling portion 58 performs rendering by the RIP engine 59 of company C and stores a rendering result RP1 in the image storing portion 60.

8. The comparison data managing portion 63 reads out the rendering result RP1 from the image storing portion 60.

9. The comparison data managing portion 63 outputs the job attributes JZ1 within DFE and the rendering result RP1 to the comparison data input/output portion 62.

10. The comparison data input/output portion 62 stores the job attributes JZ1 within DFE and the rendering result RP1 in the USB memory 3311.

Comparison Mode

1. A PDL and a JDF 81a in the company A form created by the application 12 of company A are input to the DFE 32.

2. The job receiving portion 51 outputs a print job 1001 to the system controlling portion 52. The system controlling portion 52 outputs the print job 1001 to the job controlling portion 55.

3. The job controlling portion 55 outputs the JDF 81a in the company A form to the JDF analyzing portion 56.

4. The JDF analyzing portion 56 analyzes the JDF 81a to determine that the JDF 81a is in the company A form. The JDF analyzing portion 56 converts the JDF 81a into job attributes JZ2 within DFE using the conversion table 67 for company A. The JDF analyzing portion 56 outputs the job attributes JZ2 within DFE to the comparison data managing portion 63.

5. The JDF analyzing portion 56 outputs the job attributes JZ2 within DFE to the job controlling portion 55.

6. The job controlling portion 55 converts the job attributes JZ2 within DFE and the PDL into an "RIP Parameter List" and outputs the "RIP Parameter List" to the RIP controlling portion 58.

7. The RIP controlling portion 58 performs rendering by the RIP engine 59 of company C and stores a rendering result RP2 in the image storing portion 60.

8. The comparison data managing portion 63 reads out the rendering result RP2 from the image storing portion 60.

9. The comparison data input/output portion 62 reads out the job attributes JZ1 within DFE and the rendering result RP1 from the USB memory 3311.

10. The comparison data input/output portion 62 outputs the job attributes JZ1 within DFE and the rendering result RP1 to the comparison data managing portion 63.

11. The comparison data managing portion 63 outputs the job attributes JZ1 within DFE and the job attributes JZ2 within DFE to the job attributes within DFE comparing portion 64.

The job attributes within DFE comparing portion 64 creates job attributes within DFE comparison information 1101.

12. The comparison data managing portion 63 outputs the rendering result RP1 and the rendering result RP2 to the RIP result comparing portion 65. The RIP result comparing portion 65 creates RIP result comparison information 1102.

13. The job comparison result displaying portion 66 obtains the job attributes within DFE comparison information 1101 and the RIP result comparison information 1102.

By switching the operation modes in this manner, the DFE 32 can display the job attributes within DFE comparison information 1101 and the RIP result comparison information 1102. In addition, the DFE 32 in FIG. 11-(*a*) may be configured to be the first DFE shown in FIG. 1-(*a*) without the conversion function 71 and the DFE 32 in FIG. 11-(*b*) may be configured to be the second DFE that performs rendering without modification. In this case, the comparison data generation mode is unnecessary and the DFE 32 operates in the comparison mode.

(Comparison Between the Job Attributes JZ1 and JZ2 within DFE)

Figure 12:
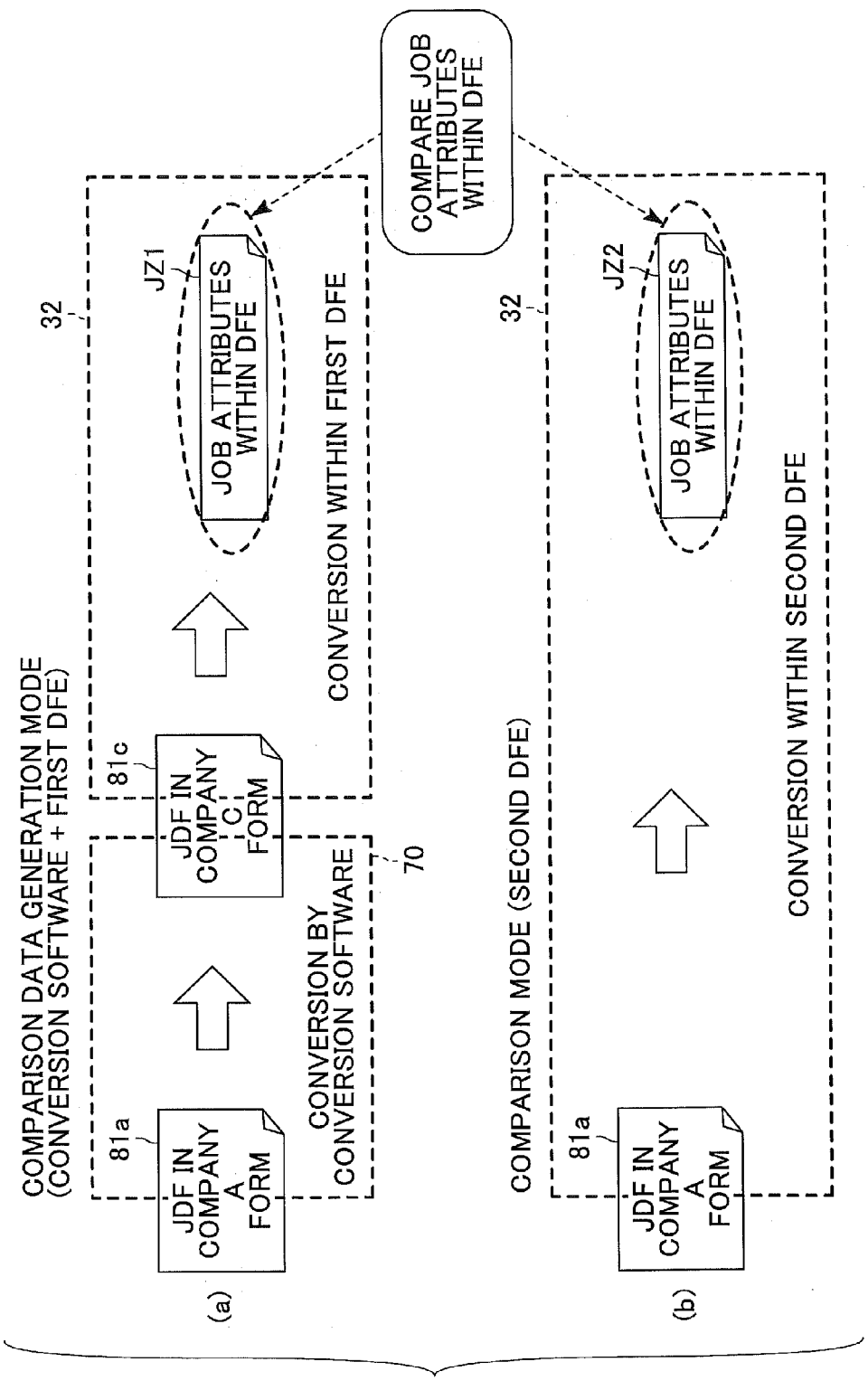
FIG. 12 is an example of a diagram showing job attributes JZ1 within DFE created in a comparison data generation mode and job attributes JZ2 within DFE created in a comparison mode.

FIG. 12-(*a*) is an example of a diagram showing job attributes JZ1 within DFE created in the comparison data generation mode and FIG. 12-(*b*) is an example of a diagram showing job attributes JZ2 within DFE created in the comparison mode.

In the comparison data generation mode, the conversion software 70 converts the JDF 81*a* in the company A form into the JDF 81*c* in the company C form. The first DFE converts the JDF 81*c* in the company C form into the job attributes JZ1 within DFE using the conversion table 67 for company C.

By contrast, in the comparison mode, the second DFE converts the JDF 81*a* in the company A form into the job attributes JZ2 within DFE using the conversion table 67 for company A.

Since both of the job attributes JZ1 within DFE and the job attributes JZ2 within DFE are converted from the JDF 81*a* in the company A form and are to be rendered by the RIP engine 59 of company C, all items must be the same and have the same item values. However, because a number of conversions is different depending on whether the conversion software 70 is used and different conversion tables 67 are used, some item values that do not completely match may be generated.

Figure 13:
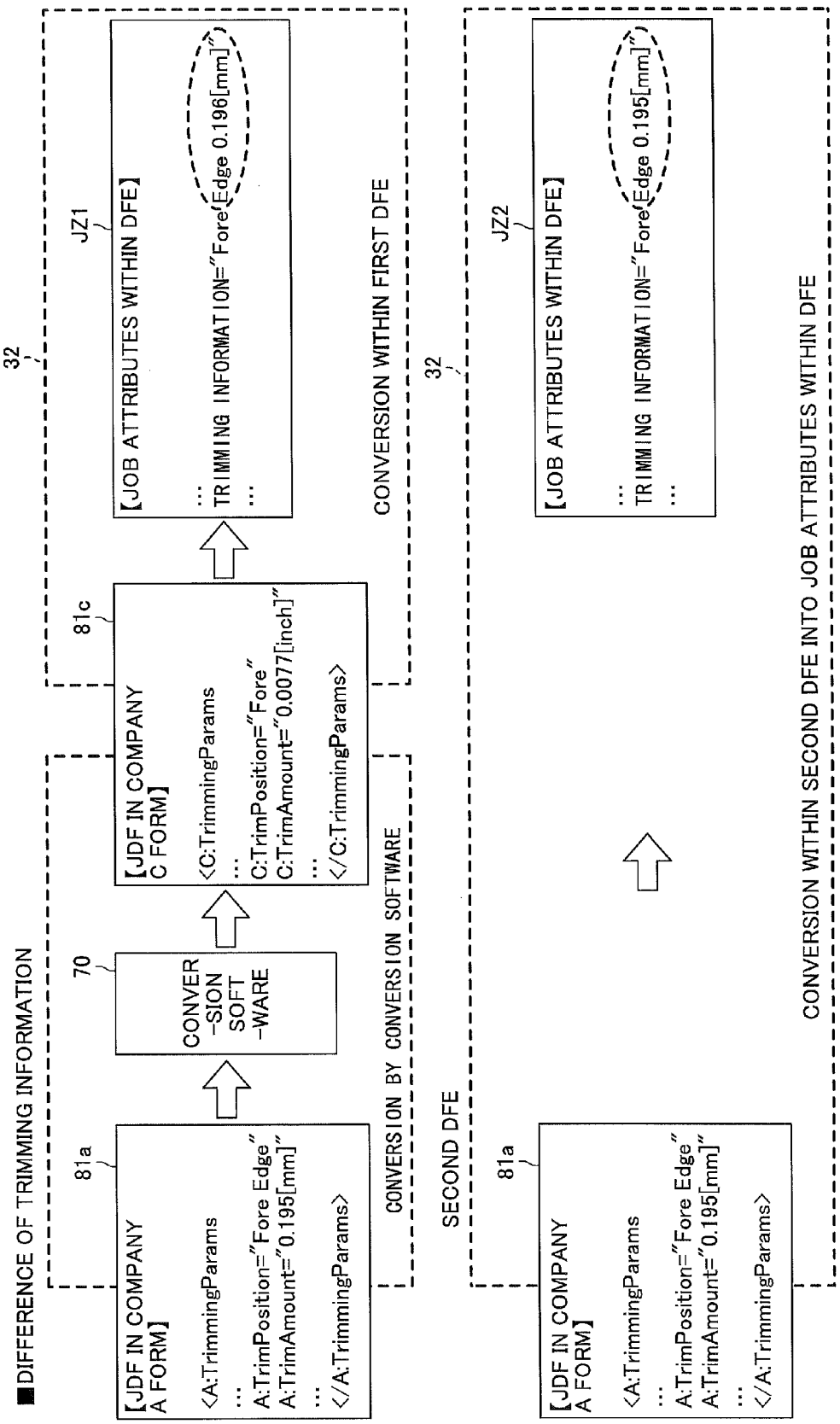
FIG. 13 is a diagram showing an example of mismatched attributes between job attributes JZ1 within DFE and job attributes JZ2 within DFE.

FIG. 13 is a diagram showing an example of mismatched attributes between the job attributes JZ1 within DFE and the job attributes JZ2 within DFE.

Attributes of the job attributes JZ1 within DFE are described below. In the JDF 81*a* in the company A form, an amount of trimming "TrimAmount" is "0.195 (mm)". While the conversion software 70 converts the JDF 81*a* in the company A form into the JDF 81*c* in the company C form, the conversion software 70 has rules that the amount of trimming is represented in inches to the fourth decimal place.

Since 0.195 (mm)=0.00767715 (inch), when the JDF 81*a* in the company A form is converted into the JDF 81*c* in the company C form, the amount of trimming converted into inches to the fourth decimal place is represented as "0.0077 (inch)" (rounded up to the fourth decimal place).

The first DFE converts the JDF 81*c* in the company C form into the job attributes JZ1 within DFE. Job attributes within DFE have rules that the amount of trimming is represented in millimeters to the third decimal place. Since 0.0077 (inch) =0.195580391 (mm), when the JDF 81*c* in the company C form is converted into the job attributes JZ1 within DFE, the amount of trimming converted into millimeters is represented as "0.196 (mm)" (rounded up to the third decimal place).

Attributes of the job attributes JZ2 within DFE are described below. The second DFE converts the JDF 81*a* in the company A form into the job attributes JZ2 within DFE. In the job attributes within DFE, the amount of trimming is represented in millimeters to the third decimal place in the same manner. In the JDF 81*a* in the company A form, the amount of trimming is "0.195 (mm)". When the JDF 81*a* in the company A form is converted into the job attributes JZ2 within DFE, the amount of trimming "0.195 (mm)" remains unchanged.

It is understood that item values may be different between the job attributes JZ1 within DFE and the job attributes JZ2 within DFE as a result. The job attributes within DFE comparing portion 64 compares the job attributes JZ1 within DFE with the job attributes JZ2 within DFE for each item and creates job attributes within DFE comparison information.

FIG. 14 is a diagram showing an example of the job attributes within DFE comparison information. In FIG. 14, for each item of the job attributes within DFE, an item value of the job attributes JZ1 within DFE is associated with an item value of the job attributes JZ2 within DFE.

In the Job information, the "number of copies" is "1" in the job attributes JZ1 within DFE and the job attributes JZ2 within DFE.

In the Job information, the "number of pages" is "5" in the job attributes JZ1 within DFE and the job attributes JZ2 within DFE.

In the Edit information, the "direction information" is "Portrait" in the job attributes JZ1 within DFE and the job attributes JZ2 within DFE.

In the Edit information, the "printing surface information" is "Surface" in the job attributes JZ1 within DFE and the job attributes JZ2 within DFE.

In the Edit information, the "rotation" is "0°" in the job attributes JZ1 within DFE and the job attributes JZ2 within DFE.

In the Edit information, the "scaling up/down" is "ReduceToFit" in the job attributes JZ1 within DFE and the job attributes JZ2 within DFE.

In the Edit information, the "image position: offset" is "x" or "y" in the job attributes JZ1 within DFE and the job attributes JZ2 within DFE.

In the Edit information, the "image position: positional adjustment information" is "center" in the job attributes JZ1 within DFE and the job attributes JZ2 within DFE.

In the Edit information, the "layout information: custom imposition arrangement" is "1×1 up" in the job attributes JZ1 within DFE and the job attributes JZ2 within DFE.

In the Edit information, the "layout information: page number" is "page number type 1" in the job attributes JZ1 within DFE and the job attributes JZ2 within DFE.

In the Edit information, the "layout information: imposition information" is "Normal" in the job attributes JZ1 within DFE and the job attributes JZ2 within DFE.

In the Edit information, the "layout information: page order information" is "page order type 1" in the job attributes JZ1 within DFE and the job attributes JZ2 within DFE.

In the Edit information, the "layout information: creep positional adjustment" is "x" or "y" in the job attributes JZ1 within DFE and the job attributes JZ2 within DFE.

In the Edit information, the "margin information" is "x" in the job attributes JZ1 within DFE and the job attributes JZ2 within DFE.

In the Edit information, the "crop mark information: center crop mark information" is "None" in the job attributes JZ1 within DFE and the job attributes JZ2 within DFE.

In the Edit information, the "crop mark information: corner crop mark information" is "None" in the job attributes JZ1 within DFE and the job attributes JZ2 within DFE.

In the Finishing information, the "Collate information" is "None" in the job attributes JZ1 within DFE and the job attributes JZ2 within DFE.

In the Finishing information, the "staple/bind information" is "None" in the job attributes JZ1 within DFE and the job attributes JZ2 within DFE.

In the Finishing information, the "punch information" is "None" in the job attributes JZ1 within DFE and the job attributes JZ2 within DFE.

In the Finishing information, the "folding information" is "None" in the job attributes JZ1 within DFE and the job attributes JZ2 within DFE.

In the Finishing information, the "trimming information" is "Fore Edge 0.196 (mm)" in the job attributes JZ1 within DFE and is "Fore Edge 0.195 (mm)" in the job attributes JZ2 within DFE.

In the Finishing information, the "output tray information" is "OutputTray1" in the job attributes JZ1 within DFE and the job attributes JZ2 within DFE.

In the Finishing information, the "input tray information" is "InputTray0" in the job attributes JZ1 within DFE and the job attributes JZ2 within DFE.

In the Finishing information, the "cover sheet information" is "None" in the job attributes JZ1 within DFE and the job attributes JZ2 within DFE.

The job attributes within DFE comparing portion 64 compares the job attributes JZ1 within DFE with the job attributes JZ2 within DFE for each item and calculates a "total number of job attributes within DFE", a "number of matched attributes", a "number of mismatched attributes", and a "mismatch percentage", for example. At least one of the "total number of job attributes within DFE", the "number of matched attributes", the "number of mismatched attributes", and the "mismatch percentage" constitutes the job attributes within DFE comparison information. Further, item names and relevant item value in the job attributes JZ1 within DFE and the job attributes JZ2 within DFE also constitute the job attributes within DFE comparison information.

(Comparison Between Rendering Results 1 and 2)

Figure 15A:
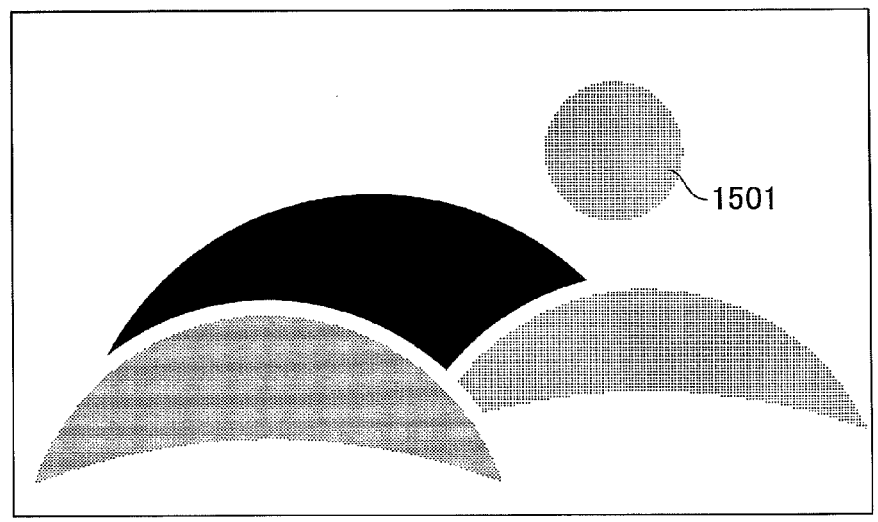
FIG. 15A is a diagram showing an example of a rendering result RP1 created in a comparison data generation mode.
Figure 15B:
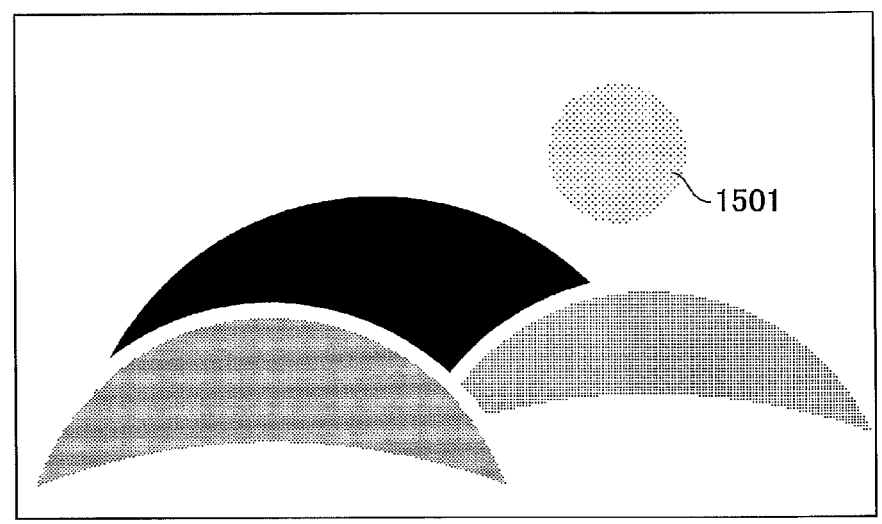
FIG. 15B is a diagram showing an example of a rendering result RP2 created in a comparison mode.
Figure 15C:
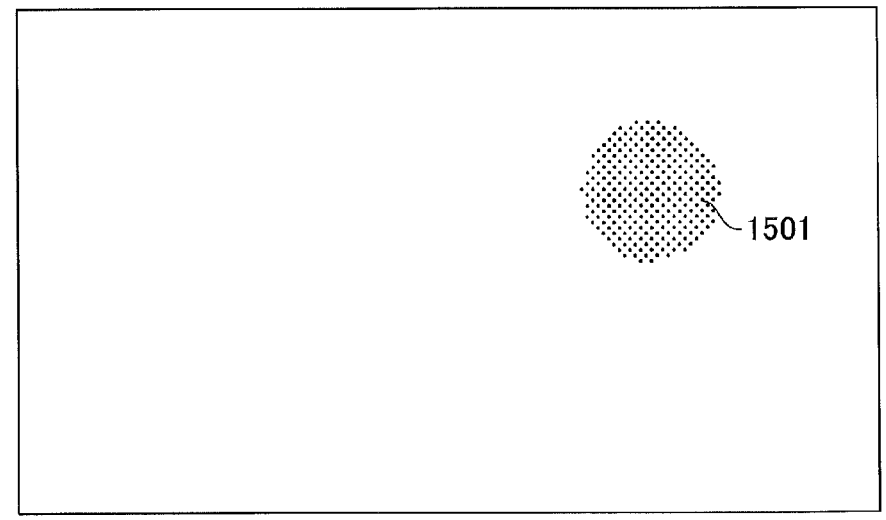
FIG. 15C is a diagram showing an example of image difference information.

FIG. 15A is a diagram showing an example of a rendering result RP1 created in the comparison data generation mode. FIG. 15B is a diagram showing an example of a rendering result RP2 created in the comparison mode. FIG. 15C is a diagram showing an example of image difference information. FIGS. 15A-C show an example where a tone of color in an area 1501 is different between the rendering result RP1 and the rendering result RP2. Accordingly, pixel values of the area 1501 are different between the rendering result RP1 and the rendering result RP2.

The RIP result comparing portion 65 compares the rendering result RP1 with the rendering result RP2 and detects the difference. Any type of comparison method may be used. For example, pixel values may be compared in each pixel.

Figure 16:
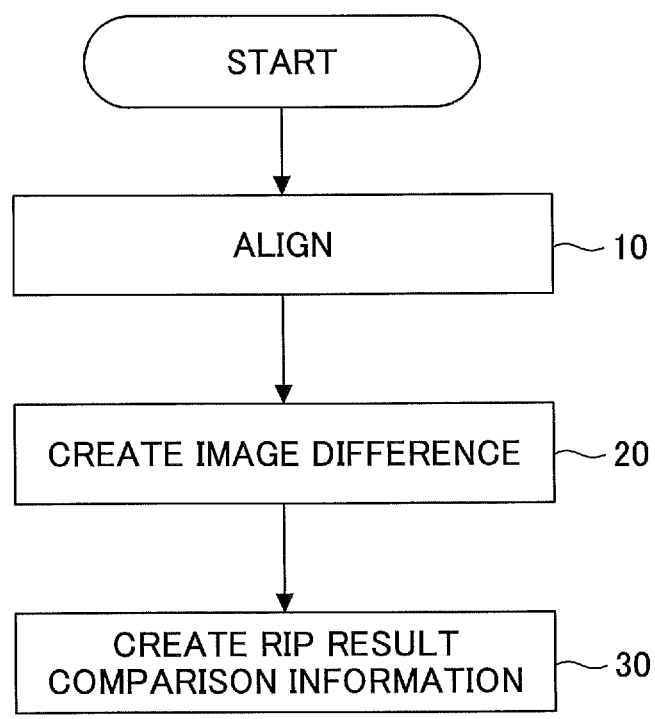
FIG. 16 is an example of a flowchart showing a procedure by which an RIP result comparing portion compares a rendering result RP1 with a rendering result RP2.

FIG. 16 is an example of a flowchart showing a procedure by which the RIP result comparing portion 65 compares the rendering result RP1 with the rendering result RP2.

S10: The RIP result comparing portion 65 aligns the rendering result RP1 with the rendering result RP2 such that the rendering result RP1 and the rendering result RP2 are superposed. In the present embodiment, an influence of rotation and scaling that may result from the comparison data generation mode and the comparison mode is also to be detected. Accordingly, the rendering result RP1 is aligned with the rendering result RP2 without correcting an angle or a size of the rendering result RP1 or the rendering result RP2 such that predetermined positions (upper left ends of the two rendering results, for example) are superposed.

S20: The RIP result comparing portion 65 creates image difference information that indicates a difference between the rendering result RP1 and the rendering result RP2. The RIP result comparing portion 65 detects an absolute value of a difference of pixel values in each pixel and creates the image difference information. In accordance with this, the image difference information shown in FIG. 15C is obtained. Since pixel values in the area 1501 are different, a non-zero pixel value is set in the area 1501 and it is understood that the rendering result RP1 and the rendering result RP2 are different in the area 1501.

S30: The RIP result comparing portion 65 analyzes the image difference information to create RIP result comparison information. Examples of the RIP result comparison information include a number of mismatched pixels, a number of mismatched pixel areas (an example of a "number of mismatched locations" in the Claims), and a mismatched pixel percentage. The number of mismatched pixels indicates a sum of pixels with non-zero pixel values. The number of mismatched pixel areas indicates a number of areas of successive pixels with non-zero pixel values. The mismatched pixel percentage indicates a percentage of mismatched pixels relative to all of pixels. In addition, the image difference information is also included in the RIP result comparison information.

FIG. 17 is a diagram showing an example of the RIP result comparison information. For each page, the number of mismatched pixels, the number of mismatched pixel areas, and the mismatched pixel percentage are calculated. The job comparison result displaying portion 66 can display at least one of the number of mismatched pixels, the number of mismatched pixel areas, and the mismatched pixel percentage on the display screen 330.

(Examples of Display of Job Attributes within DFE Comparison Information and RIP Result Comparison Information)

Figure 18A:
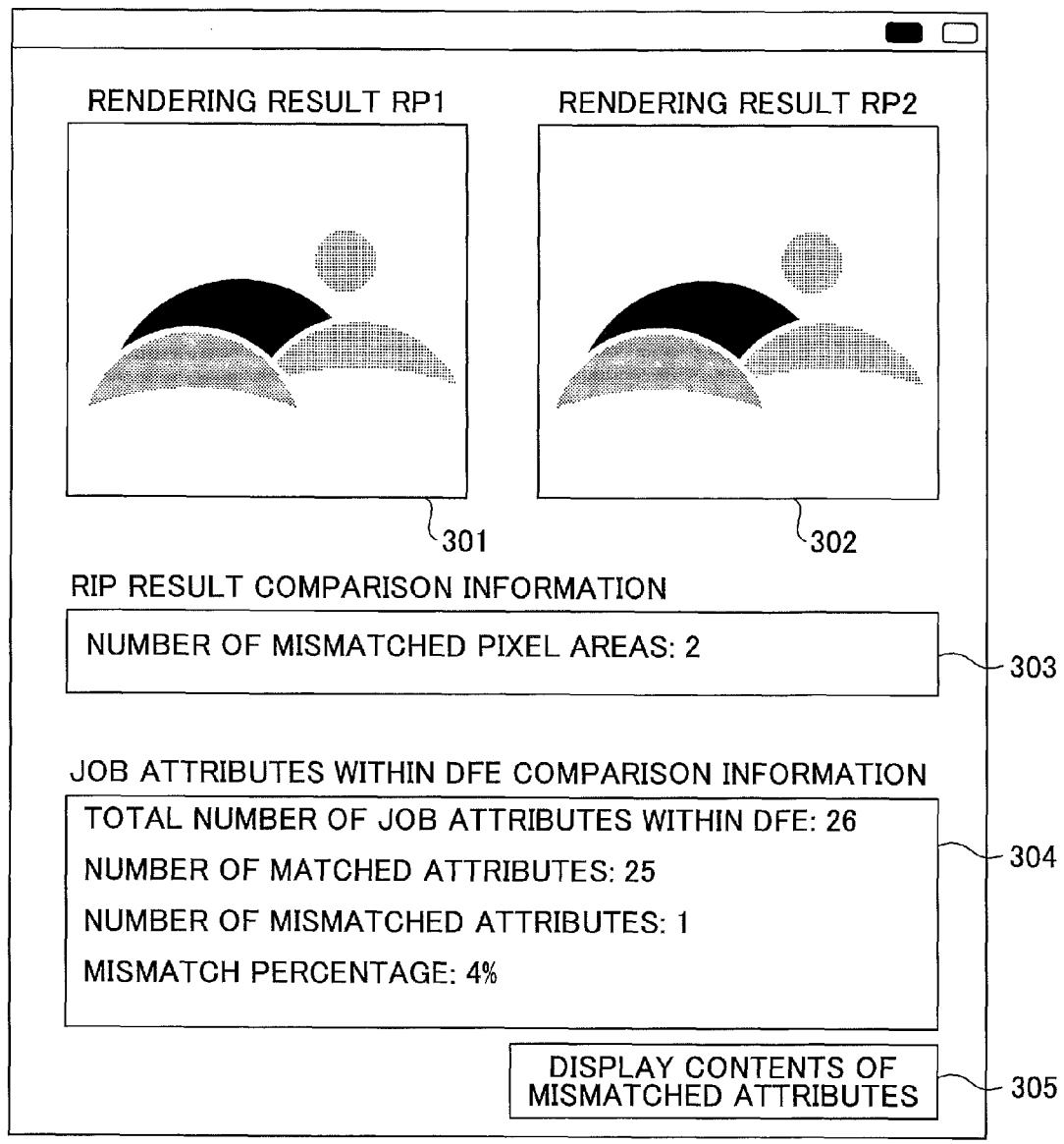
FIG. 18A is a diagram showing an example of a comparison result screen displayed on a display screen.

FIG. 18A is a diagram showing an example of a comparison result screen displayed on the display screen 330. The comparison result screen includes rendering result displaying areas 301, 302, an RIP result comparison information area 303, a job attributes within DFE comparison information area 304, and a button 305 for displaying contents of mismatched attributes.

In the rendering result displaying area 301, the rendering result RP1 is displayed. In the rendering result displaying area 302, the rendering result RP2 is displayed. Accordingly, the rendering result RP1 and the rendering result RP2 are simultaneously displayed on the display screen 330 to allow comparison. In the RIP result comparison information area 303, the number of mismatched pixel areas is displayed. In the job attributes within DFE comparison information area 304, the total number of job attributes within DFE, the number of matched attributes, the number of mismatched attributes, and the mismatch percentage are displayed.

Figure 18B:
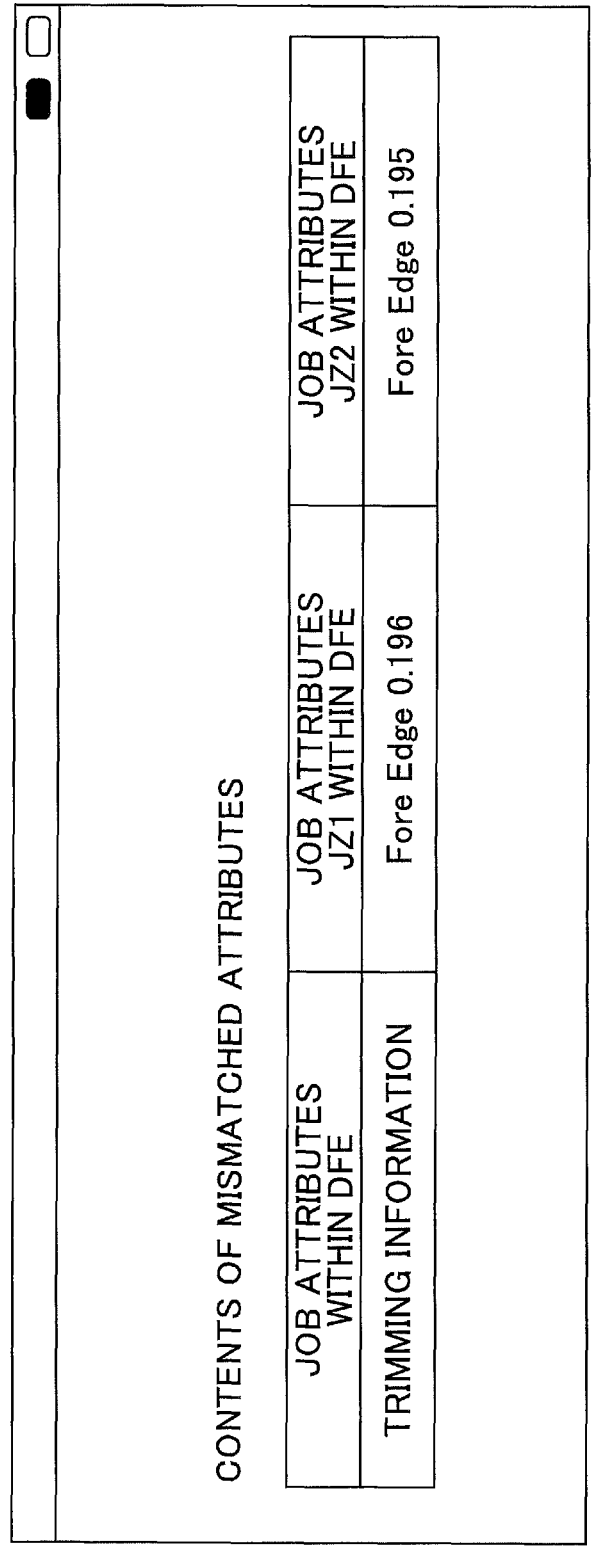
FIG. 18B is a diagram showing an example of contents of mismatched attributes displayed on a display screen.

When a user presses the button 305 for displaying contents of mismatched attributes, a screen showing contents of mismatched attributes shown in FIG. 18B is displayed on the display screen 330. The screen showing contents of mismatched attributes displays an item name and relevant item values that are not corresponding to each other between the job attributes JZ1 within DFE and the job attributes JZ2 within DFE.

Accordingly, the user can comprehend a comparison result of rendering results and a comparison result of job attributes within DFE by viewing the comparison result screen displayed on the display screen 330. Further, the user can comprehend a specific item and how relevant item values are different by viewing the screen showing contents of mismatched attributes.

(Selection of Operation Mode)

FIG. 19 is a diagram showing an example of an operation mode setting screen displayed on the display screen 330. It is possible to display the operation mode setting screen when the user operates the DFE 32. In the operation mode setting screen, an operation mode area 502 is disposed for a message 501 "DFE system operation mode". Further, a setting button 505 is disposed.

When the user presses a pull-down key 503 of the operation mode area 502, a pull-down menu 504 is displayed. In the pull-down menu 504, menu items a "normal mode", a "comparison data generation mode", and a "comparison mode" are selectively displayed.

If the user wishes to judge whether the conversion function of the DFE 32 is the same as the conversion software 70, the user selects the comparison data generation mode in the pull-down menu 504. When job attributes JZ1 within DFE and a rendering result RP1 are created in the comparison data generation mode, the user selects the comparison mode. In accordance with this, a comparison result screen as shown in FIG. 18A is displayed on the display screen 330.

In addition to directly operating the DFE 32, the user can operate the client PC 11 or the PC server 21 to change the operation mode of the DFE 32 via the network 3.

(Operation Sequence)

Figure 20:
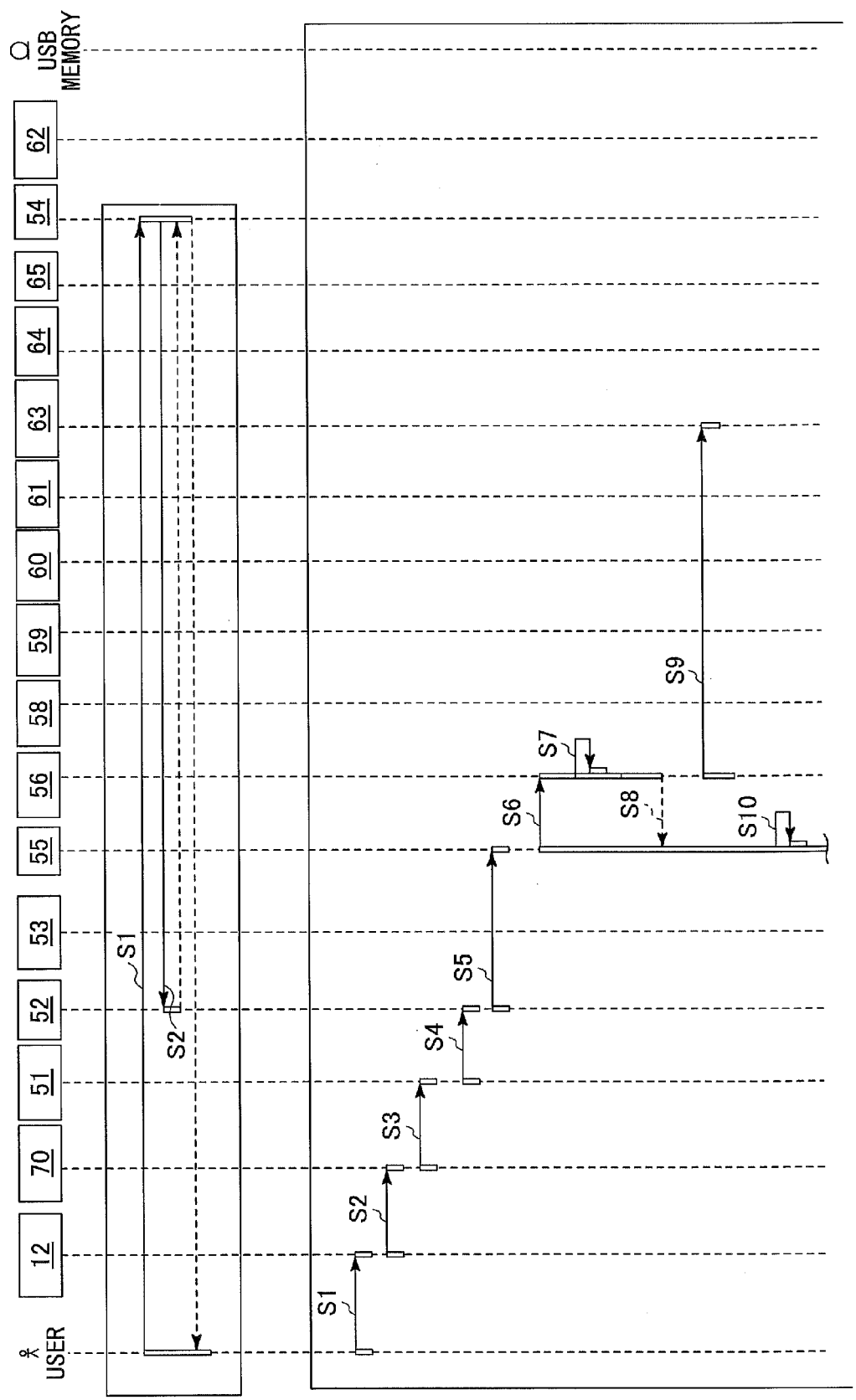
FIG. 20 is an example of a sequence diagram of a printing system if a comparison data generation mode is set.
Figure 21:
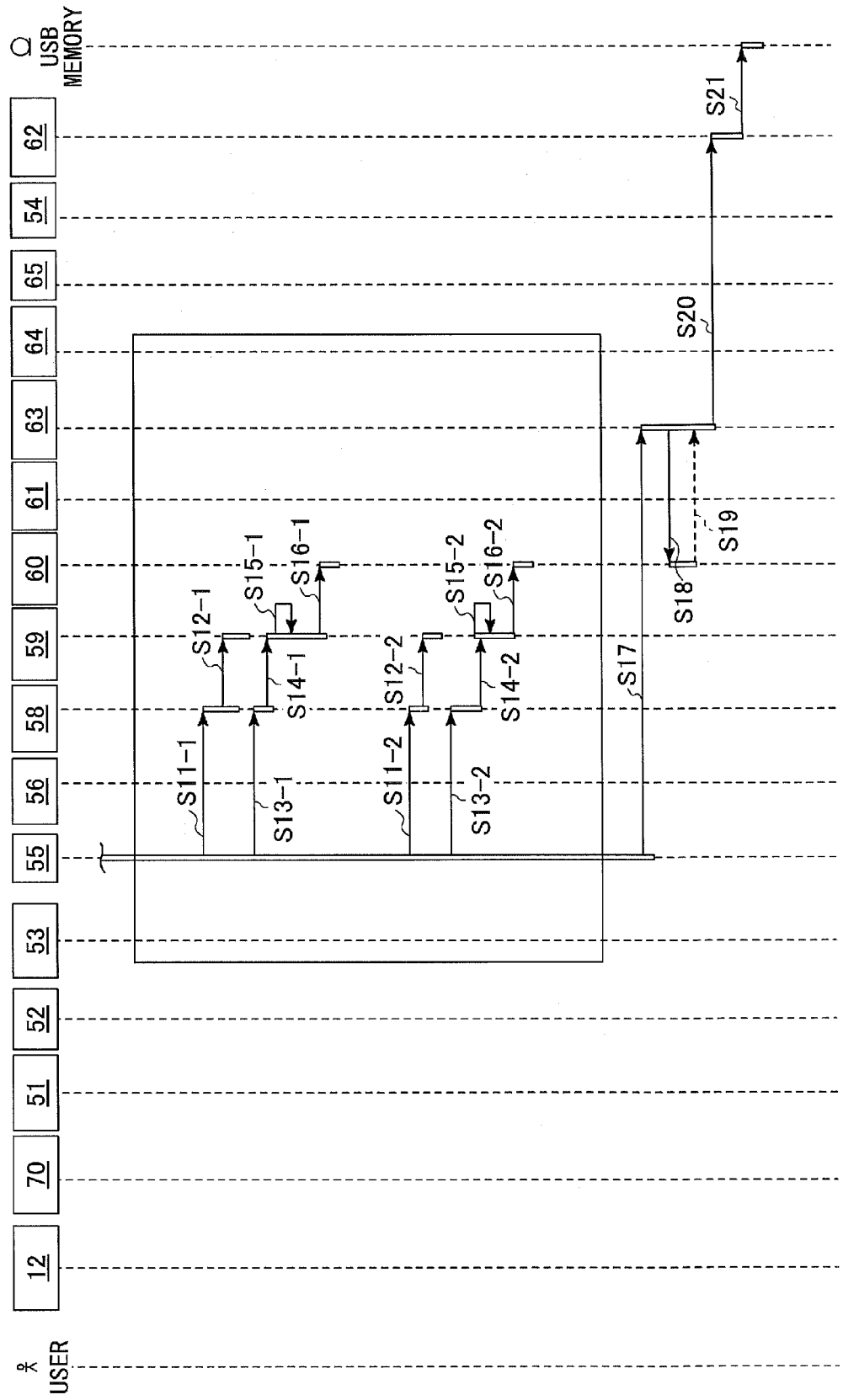
FIG. 21 is an example of a sequence diagram of a printing system if a comparison data generation mode is set.

In the following, an operation sequence of the printing system 200 is described with reference to FIGS. 20 and 21. FIGS. 20 and 21 are examples of a sequence diagram of the printing system 200 when the comparison data generation mode is set.

S1: The user operates the operation mode setting screen to set an operation mode of the DFE to the comparison data generation mode. The UI controlling portion 54 accepts this setting.

S2: The UI controlling portion 54 reports that the comparison data generation mode is set to the system controlling portion 52. In accordance with this, the system controlling portion 52 can control a flow of a print job and output job attributes JZ1 within DFE to the comparison data managing portion 63, and the job attributes JZ1 within DFE and a rendering result RP1 are stored in a USB memory.

Then the user inputs a JDF 81a in the company A form and a PDL to the DFE 32.

S1: The user operates the application 12 of company A to create a print job.

S2: The application 12 of company A inputs the print job (the JDF 81a in the company A form and the PDL) to the conversion software 70.

S3: The conversion software 70 converts the JDF 81a in the company A form into a JDF 81c in the company C form and outputs the print job to the job receiving portion 51.

S4: The job receiving portion 51 outputs the print job (the JDF 81c in the company C form and the PDL) to the system controlling portion 52.

S5: The system controlling portion 52 outputs the print job (the JDF 81c in the company C form and the PDL) to the job controlling portion 55.

S6: The job controlling portion 55 outputs a conversion request and the JDF 81c in the company C form to the JDF analyzing portion 56.

S7: The JDF analyzing portion 56 converts the JDF 81c in the company C form into job attributes JZ1 within DFE.

S8: The JDF analyzing portion 56 outputs the job attributes JZ1 within DFE to the job controlling portion 55.

S9: The JDF analyzing portion 56 also outputs the job attributes JZ1 within DFE to the comparison data managing portion 63 because the operation mode is in the comparison data generation mode.

S10: The job controlling portion 55 uses the job attributes JZ1 within DFE and the PDL to create an "RIP Parameter List".

Following the above-mentioned sequence, the DFE 32 performs rendering in the same manner as in the normal mode. The process below is different depending on whether the "RIP control mode" is in the "Page Mode" or the "Sheet Mode".

The "Page Mode" is described below.

S11-1: The job controlling portion 55 outputs the "RIP Parameter List" to the RIP controlling portion 58.

S12-1: The RIP controlling portion 58 initializes the RIP engine 59 of company C.

S13-1 The job controlling portion 55 sends an RIP execution request to the RIP controlling portion 58.

S14-1: The RIP controlling portion 58 instead of the job controlling portion 55 outputs an RIP command. If the "RIP control mode" is in the "Page Mode", the RIP controlling portion 58 outputs the RIP command in a sequence suitable for the "Page Mode".

S15-1: The RIP engine 59 of company C performs rasterization.

S16-1: The RIP engine 59 of company C stores raster data in the image storing portion 60.

The "Sheet Mode" is described below.

S11-2: The job controlling portion 55 outputs the "RIP Parameter List" to the RIP controlling portion 58.

S12-2: The RIP controlling portion 58 initializes the RIP engine 59 of company C.

S13-2: The job controlling portion 55 sends an RIP execution request to the RIP controlling portion 58.

S14-2: If the "RIP control mode" is in the "Sheet Mode", the RIP controlling portion 58 outputs an RIP command in a sequence suitable for the "Sheet Mode".

S15-2: The RIP engine 59 of company C performs rasterization.

S16-2: The RIP engine 59 of company C stores raster data in the image storing portion 60.

A rendering result RP1 is stored in the image storing portion 60 in the "Page Mode" or the "Sheet Mode". Next, the DFE 32 in the comparison data generation mode stores the job attributes JZ1 within DFE and the rendering result RP1 in the USB memory.

S17: The job controlling portion 55 sends notification of an end of RIP of the job to the comparison data managing portion 63.

S18: The comparison data managing portion 63 detects the end of the print job and sends a request for the rendering result RP1 to the image storing portion 60.

S19: The comparison data managing portion 63 obtains the rendering result RP1.

S20: The comparison data managing portion 63 outputs the job attributes JZ1 within DFE and the rendering result RP1 to the comparison data input/output portion 62.

S21: The comparison data input/output portion 62 stores the job attributes JZ1 within DFE and the rendering result RP1 in the USB memory.

Figure 22:
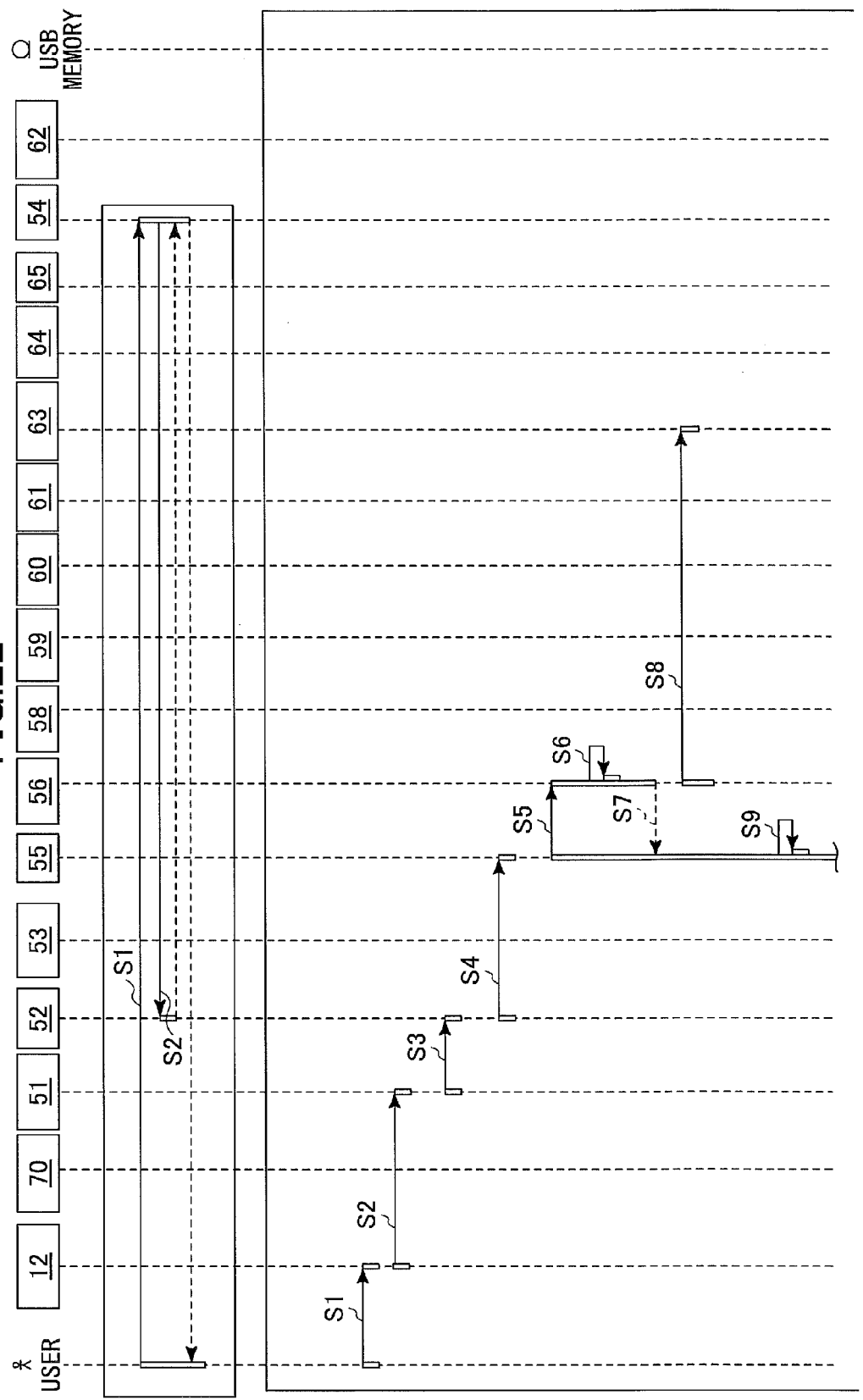
FIG. 22 is an example of a sequence diagram of a printing system if a comparison mode is set.

FIGS. 22 and 23 are examples of a sequence diagram when the comparison mode is set.

S1: The user operates the operation mode setting screen to set an operation mode of the DFE 32 to the comparison mode. The UI controlling portion 54 accepts this setting.

S2: The UI controlling portion 54 reports that the comparison mode is set to the system controlling portion 52. In accordance with this, the system controlling portion 52 can control a flow of a print job, output job attributes JZ1 within DFE and job attributes JZ2 within DFE to the job attributes within DFE comparing portion 64, and output a rendering result RP1 and a rendering result RP2 to the RIP result comparing portion 65.

The user inputs a JDF 81*a* in the company A form and a PDL to the DFE 32.

S1: The user operates the application 12 of company A to create a print job.

S2: The application 12 of company A outputs the print job (the JDF 81*a* in the company A form and the PDL) to the job receiving portion 51.

S3: The job receiving portion 51 outputs the print job (the JDF 81*a* in the company A form and the PDL) to the system controlling portion 52.

S4: The system controlling portion 52 outputs the print job (the JDF 81*a* in the company A form and the PDL) to the job controlling portion 55.

S5: The job controlling portion 55 outputs a conversion request and the JDF 81*a* in the company A form to the JDF analyzing portion 56.

S6: The JDF analyzing portion 56 converts the JDF 81*a* in the company A form into job attributes JZ2 within DFE.

S7: The JDF analyzing portion 56 outputs the job attributes JZ2 within DFE to the job controlling portion 55.

S8: The JDF analyzing portion 56 also outputs the job attributes JZ2 within DFE to the comparison data managing portion 63 because the operation mode is in the comparison mode.

S9: the job controlling portion 55 uses the job attributes JZ2 within DFE and the PDL to create an "RIP Parameter List".

Following the above sequence, the DFE 32 performs rendering in the same manner as in the normal mode. Operations in the "Page Mode" and the "Sheet Mode" are the same as in FIG. 21. A rendering result RP2 is stored in the image storing portion 60 in the "Page Mode" or the "Sheet Mode".

Next, the DFE 32 in the comparison mode performs a process to compare the job attributes JZ1 within DFE with the job attributes JZ2 within DFE and a process to compare the rendering result RP1 with the rendering result RP2.

S16: The job controlling portion 55 sends notification of an end of RIP of the job to the comparison data managing portion 63.

S17: The comparison data managing portion 63 detects the end of the print job and sends a request for the rendering result RP2 to the image storing portion 60.

S18: The comparison data managing portion 63 obtains the rendering result RP2.

S19: The comparison data managing portion 63 sends a request for the job attributes JZ1 within DFE and the rendering result RP1 to the comparison data input/output portion 62.

S20: The comparison data input/output portion 62 sends a request for the job attributes JZ1 within DFE and the rendering result RP1 to the USB memory.

S21: The comparison data input/output portion 62 obtains the job attributes JZ1 within DFE and the rendering result RP1 from the USB memory.

S22: The comparison data managing portion 63 obtains the job attributes JZ1 within DFE and the rendering result RP1 from the comparison data input/output portion 62.

S23: The comparison data managing portion 63 outputs the job attributes JZ1 within DFE and the job attributes JZ2 within DFE to the job attributes within DFE comparing portion 64.

S24: The job attributes within DFE comparing portion 64 compares the job attributes JZ1 within DFE with the job attributes JZ2 within DFE to create job attributes within DFE comparison information.

S25: The job attributes within DFE comparing portion 64 outputs the job attributes within DFE comparison information to the UI controlling portion 54.

S26: The comparison data managing portion 63 outputs the rendering result RP1 and the rendering result RP2 to the RIP result comparing portion 65.

S27: The RIP result comparing portion 65 compares the rendering result RP1 with the rendering result RP2 to create RIP result comparison information.

S28: The RIP result comparing portion 65 outputs the RIP result comparison information to the UI controlling portion 54.

S29: The job comparison result displaying portion 66 of the UI controlling portion 54 displays the job attributes within DFE comparison information and the RIP result comparison information on the display screen 330.

As mentioned above, in the present embodiment, the job attributes JZ1 within DFE are compared with the job attributes JZ2 within DFE, the rendering result RP1 is compared with the rendering result RP2, and comparison results are provided. In accordance with this, the present embodiment is capable of supporting the user to judge whether the DFE 32 has the same conversion function 71 as in the conversion software 70.

(Preferable Modification)

While the best mode for implementing the present invention has been described based on the embodiment above, the present invention is not limited to this embodiment at all but various types of modifications or replacements can be added without departing from the points of the present invention.

For example, while the DFE 32 in FIG. 5 has all the functions described in the embodiment, each of these functions may be disposed on separate devices capable of communication via a network. For example, each function may be present on the network accessible to the JDF analyzing portion 56 and the RIP portion 57. Further, the job attributes within DFE comparing portion 64 may be present on a place where job attributes JZ1 within DFE can be compared with job attributes JZ2 within DFE and the RIP result comparing portion 65 may be present on a place where rendering result RP1 can be compared with rendering result RP2, for example.

The image storing portion 60 and the job data storing portion 53 may also be present on a network accessible to the DFE 32.

Further, while the operations of the DFE 32 are described separately in the comparison data generation mode and in the comparison mode in the present embodiment, the comparison data generation mode and the comparison mode may be integrated into a single operation mode. In this case, in a first half of the single operation mode, the job attributes JZ1 within DFE and the rendering result RP1 are created. Then in a second half of the single operation mode, the JDF in the company A form and the PDL are input, the job attributes JZ2 within DFE and the rendering result RP2 are created, and the job attributes JZ1 within DFE are compared with the job attributes JZ2 within DFE and the rendering result RP1 is compared with the rendering result RP2.

Further, the present invention is not limited to these embodiments, and various variations and modifications may be made without departing from the scope of the present invention.

The present application is based on and claims the benefit of priority of Japanese Priority Patent Application No. 2014-

050520 filed on Mar. 13, 2014 and Japanese Priority Patent Application No. 2015-036556 filed on Feb. 26, 2015, the entire contents of which are hereby incorporated by reference.

What is claimed is:

1. An information processing apparatus for generating drawing data by using a print job including setting information and printing data, the information processing apparatus comprising:
   a conversion unit that converts first setting information into first apparatus setting information in accordance with a form of the first setting information and converts second setting information, converted from the first setting information, into second apparatus setting information in accordance with a form of the second setting information;
   an information obtaining unit that obtains the second apparatus setting information;
   a first comparison result information creating unit that creates apparatus setting information comparison result information by comparing the first apparatus setting information with the second apparatus setting information;
   a drawing data generating unit that generates first drawing data by using the first apparatus setting information and the printing data and generates second drawing data by using the second apparatus setting information and the printing data, wherein the information obtaining unit obtains the second drawing data; and
   a second comparison result information creating unit that creates drawing data comparison result information by comparing the first drawing data with the second drawing data.

2. The information processing apparatus as claimed in claim 1, wherein the first setting information is converted into the second setting information by an external device and the second setting information is input to the information processing apparatus.

3. The information processing apparatus as claimed in claim 1,
   wherein the conversion unit stores the second apparatus setting information in a storage unit,
   wherein the drawing data generating unit stores the second drawing data in the storage unit, and
   wherein the information obtaining unit obtains the second apparatus setting information and the second drawing data from the storage unit.

4. The information processing apparatus as claimed in claim 1, further comprising:
   a first comparison result information displaying unit that displays apparatus setting information comparison result information on a display device, wherein the first comparison result information creating unit compares a value of the first apparatus setting information with a value of the second apparatus setting information for each setting item of the first apparatus setting information and creates the apparatus setting information comparison result information including a setting item having different values and the different values in the setting item.

5. The information processing apparatus as claimed in claim 4, wherein the first comparison result information displaying unit displays a total number of setting items included in the first apparatus setting information and the second apparatus setting information, a number of setting items having different values, a number of setting items having matched values, or a percentage of setting items having different values relative to the total number on the display device.

6. The information processing apparatus as claimed in claim 4, further comprising:
   a second comparison result information displaying unit that displays drawing data comparison result information on the display device, wherein the drawing data comparison result information includes a number of mismatched locations between the first drawing data and the second drawing data.

7. The information processing apparatus as claimed in claim 6, wherein the second comparison result information displaying unit simultaneously displays the first drawing data and the second drawing data on the display device.

8. The information processing apparatus as claimed in claim 6,
   wherein the first comparison result information displaying unit displays the apparatus setting information comparison result information for each page included in a print job on the display device, and
   wherein the second comparison result information displaying unit displays the drawing data comparison result information for each page included in the print job on the display device.

9. An information processing method for generating drawing data by using a print job including setting information and printing data, the information processing method comprising:
   by converting, by a processor in communication with memory, first setting information into first apparatus setting information in accordance with a form of the first setting information and converting second setting information, converted from the first setting information, into second apparatus setting information in accordance with a form of the second setting information;
   obtaining the second apparatus setting information;
   creating apparatus setting information comparison result information by comparing the first apparatus setting information with the second apparatus setting information;
   generating first drawing data by using the first apparatus setting information and the printing data;
   generating second drawing data by using the second apparatus setting information and the printing data; and
   creating drawing data comparison result information by comparing the first drawing data with the second drawing data.

10. A non-transitory computer-readable storage medium storing a computer-readable program that, when executed by a computer, causes an information processing apparatus for generating drawing data by using a print job including setting information and printing data to perform a process, the process comprising:
   converting first setting information into first apparatus setting information in accordance with a form of the first setting information and converting second setting information, converted from the first setting information, into second apparatus setting information in accordance with a form of the second setting information;
   obtaining the second apparatus setting information;
   creating apparatus setting information comparison result information by comparing the first apparatus setting information with the second apparatus setting information;
   generating first drawing data by using the first apparatus setting information and the printing data;
   generating second drawing data by using the second apparatus setting information and the printing data; and creating drawing data comparison result information by comparing the first drawing data with the second drawing data.

\* \* \* \* \*